United States Patent
Baskaran et al.

(10) Patent No.: US 11,726,197 B2
(45) Date of Patent: Aug. 15, 2023

(54) SYSTEMS AND METHODS FOR EFFICIENT TARGETING

(71) Applicant: QUALCOMM TECHNOLOGIES, INC., San Diego, CA (US)

(72) Inventors: Muthu M. Baskaran, Old Tappan, NJ (US); Thomas Henretty, Brooklyn, NY (US); Ann Johnson, Saratoga, CA (US); Athanasios Konstantinidis, Brooklyn, NY (US); M. H. Langston, Beacon, NY (US); Janice O. McMahon, Bethesda, MD (US); Benoit J. Meister, New York, NY (US); Paul D. Mountcastle, Moorestown, NJ (US); Aale Naqvi, New York, NY (US); Benoit Pradelle, Cologne (DE); Tahina Ramanananandro, New York, NY (US); Sanket Tavarageri, New York, NY (US); Richard A. Lethin, New York, NY (US)

(73) Assignee: QUALCOMM Technologies, Inc., San Diego, CA (US)

(*) Notice: Subject to any disclaimer, the term of this patent is extended or adjusted under 35 U.S.C. 154(b) by 484 days.

(21) Appl. No.: 16/653,201

(22) Filed: Oct. 15, 2019

(65) Prior Publication Data

US 2020/0284896 A1 Sep. 10, 2020

Related U.S. Application Data

(62) Division of application No. 14/987,240, filed on Jan. 4, 2016, now Pat. No. 10,466,349.

(Continued)

(51) Int. Cl.
  *G01S 13/72* (2006.01)
  *G01S 7/41* (2006.01)

(Continued)

(52) U.S. Cl.
  CPC ............ *G01S 13/723* (2013.01); *G01S 7/411* (2013.01); *G01S 7/4802* (2013.01);

(Continued)

(58) Field of Classification Search
  CPC ...... G01S 13/931; G01S 7/354; G01S 13/582; G01S 13/90; G01S 17/89; G01S 13/282;

(Continued)

(56) References Cited

U.S. PATENT DOCUMENTS

| 5,109,231 A | * | 4/1992 | Olsson | G01S 13/24 342/163 |
| 6,704,692 B1 | * | 3/2004 | Banerjee | G01S 13/726 702/155 |

(Continued)

OTHER PUBLICATIONS

Andersen E.D., et al.,"The MOSEK Interior Point Optimizer for Linear Programming: An Implementation of the Homogeneous Algorithm", High Performance Optimization, Applied Optimization, Kluwer Academic Publishers, Dordrecht, The Netherlands, vol. 33., Springer, Boston, MA, 2000, pp. 197-232, http://www.mosek.com/.

(Continued)

*Primary Examiner* — Olumide Ajibade Akonai
(74) *Attorney, Agent, or Firm* — Seyfarth Shaw LLP

(57) ABSTRACT

A system for determining the physical path of an object can map several candidate paths to a suitable path space that can be explored using a convex optimization technique. The optimization technique may take advantage of the typical sparsity of the path space and can identify a likely physical path using a function of sensor observation as constraints. A track of an object can also be determined using a track model and a convex optimization technique.

34 Claims, 17 Drawing Sheets

Related U.S. Application Data

(60) Provisional application No. 62/153,884, filed on Apr. 28, 2015, provisional application No. 62/099,343, filed on Jan. 2, 2015.

(51) Int. Cl.
| | | |
|---|---|---|
| *G01S 7/48* | (2006.01) | |
| *B64C 39/02* | (2023.01) | |
| *G01S 3/786* | (2006.01) | |
| *G01S 17/66* | (2006.01) | |
| *B64U 101/20* | (2023.01) | |

(52) U.S. Cl.
CPC ........ *B64C 39/024* (2013.01); *B64U 2101/20* (2023.01); *G01S 3/7864* (2013.01); *G01S 7/4808* (2013.01); *G01S 17/66* (2013.01)

(58) Field of Classification Search
CPC ........ G01S 13/584; G01S 7/003; G01S 13/87; G01S 13/878; G01S 7/52026; G01S 13/723; G01S 7/411; G01S 2013/93272; G01S 7/415; G01S 17/931; G01S 2013/9325; G01S 2013/93271; G01S 13/04; G01S 17/42; G01S 13/50; G01S 13/06

See application file for complete search history.

(56) References Cited

U.S. PATENT DOCUMENTS

| | | | |
|---|---|---|---|
| 7,149,147 B1 | 12/2006 | Goldman et al. | |
| 7,535,412 B1* | 5/2009 | Blunt | G01S 7/2921 342/175 |
| 8,207,887 B2 | 6/2012 | Goldman | |
| 9,329,264 B2 | 5/2016 | Jin | |
| 10,466,349 B2 | 11/2019 | Baskaran et al. | |
| 2002/0198660 A1* | 12/2002 | Lutter | G08G 1/0965 701/301 |
| 2005/0212692 A1* | 9/2005 | Iny | G01S 13/765 342/42 |
| 2009/0046001 A1* | 2/2009 | Beilin | G01S 13/5246 342/160 |
| 2010/0097200 A1* | 4/2010 | Hilsebecher | G01S 7/412 340/436 |
| 2010/0157955 A1 | 6/2010 | Liu et al. | |
| 2015/0085615 A1 | 3/2015 | Perrin et al. | |

OTHER PUBLICATIONS

Candes E., et al., "Decoding by Linear Programming", IEEE Transactions on Information Theory, Dec. 2004, pp. 1-22.

Domahidi A., et al., "ECOS: An SOCP Solver For Embedded Systems", European Control Conference, Zurich, Switzerland, Jul. 17-19, 2013, pp. 3071-3076.

Grant M.C., "The CVX Users' Guide, Release 2.1", CVX Research, Dec. 26, 2017, 101 Pages.

Gurobi Optimization, LLC, "Gurobi Optimizer Reference Manual", 2018, 773 pages.

Kay S.M., et al., "Spectrum Analysis—A Modern Perspective," Proceedings of the IEEE, vol. 69, No. 11, Digital Object Identifier: 10.1109/PROC.1981.12184, Nov. 1981, pp. 1380-1419.

Lofberg J., "YALMIP: A Toolbox for Modeling and Optimization in MATLAB", Conference Paper, Automatic Control Laboratory, ETHZ, May 2014, 7 pages.

Malioutov D., et al., "A Sparse Signal Reconstruction Perspective for Source Localization with Sensor Arrays", IEEE Transactions on Signal Processing, vol. 53, No. 8, Aug. 2005, pp. 3010-3022.

Miller B., et al., "A Multi-Sensor Compressed Sensing Receiver: Performance Bounds and Simulated Results", Proceedings of the 43rd Asilomar Conference on Signals, Systems and Computers, 2009, pp. 1571-1575.

Mountcastle P.D., et al., "Generalized Adaptive Radar Signal Processing", Proceedings of the 25th Army Science Conference, Technology Service Corporation, Dec. 1, 2008, 8 pages.

Schmidt R.O., "Multiple Emitter Location and Signal Parameter Estimation", IEEE Transactions on Antennas and Propagation, IEEE Service Center, Piscataway, NJ, US LNKDD0I: 10.1109/TAP. 1986.1143830, vol. AP-34, No. 3, Mar. 1, 1986 (Mar. 1, 1986), pp. 276-280.

Shankar R., "Principles of Quantum Mechanics," 2nd ed., Kluwer Academic/Plenum Publishers, New York, 1980, 453 pages.

Sturm J.F., "Using SeDuMi 1.02, a MATLAB Toolbox for Optimization Over Symmetric Cones", Communications Research Laboratory, McMaster University, Hamilton, Canada, Aug. 1, 1998, 24 pages.

Toh K.C., et al., "SDPT3—A Matlab Software Package for Semidefinite Programming, Version 1.3", Optimization Meth. & Soft., vol. 11 & 12, 1999, pp. 545-581.

Winter S., et al., "On Real and Complex Valued English I1-Norm Minimization for Overcomplete Blind Source Separation", IEEE Workshop on Applications of Signal Processing to Audio and Acoustics, NTT Communication Science Laboratories, Oct. 16-19, 2005, pp. 86-89.

\* cited by examiner

FIGS. 14A-C

SYSTEMS AND METHODS FOR EFFICIENT TARGETING

CROSS-REFERENCE TO RELATED APPLICATIONS

This application is a division of U.S. patent application Ser. No. 14/987,240, entitled "Systems and Methods for Efficient Targeting," which was filed on Jan. 4, 2016 and claims benefit of priority to U.S. Provisional Patent Application Ser. No. 62/099,343 entitled "Systems and Methods for Radar Targeting," filed on Jan. 2, 2015, and to U.S. Provisional Patent Application Ser. No. 62/153,884 entitled "Compressive Sensing," filed on Apr. 28, 2015, the entire contents of each of which are incorporated herein by reference.

FIELD OF THE INVENTION

This disclosure generally relates to systems and methods for analyzing properties such as location and motion of objects using sensor signals and, in particular, for performing such analysis using compressed sensor signals.

BACKGROUND

In many situations such as automatic maneuvering of airborne objects, underwater objects, objects in the outer space, and for surveillance of objects it is necessary to identify objects in a targeted region and to determine their locations and/or motions. To this end, sensors or imaging devices such as high-resolution cameras, radars, lidars, etc. are used, and the raw sensor signals are processed to extract actionable knowledge, such as identification of an object of interest, such as a vehicle in a field, a satellite launched in an orbit, etc. Actionable knowledge or information of interest can also include determining whether and how an object may be moving, such as the speed and direction of a vehicle, whether an object in space is tumbling or has left an orbit, etc.

Often, significant amounts of data (e.g., tens or hundreds of megabytes, several gigabytes, or more) must be collected from the sensor and a large number of computations (e.g., hundreds, thousands, millions, billions, or more floating-point operations) must be performed on the collected data in order to extract useful, actionable information. As such, many sensor and associated data processing systems are bulky and costly, and they generally consume a lot of power. Compressive sensing can address some of these challenges. In particular, taking advantage of the fact that the collected images are often sparse, i.e., only a fraction of the image data is associated with the object(s) of interest and a large portion (e.g., more than 50%) of the image is associated with background only, the sensors are adapted to collect only a limited number of samples and not the total number of available samples. The collected data is generally called compressively sensed data or compressed data. A co-pending U.S. patent application Ser. No. 14/699,871, entitled "Systems and Methods for Joint Angle-Frequency Determination" describes using compressed data for joint determination of angles and frequencies of signals received from targets emitting such signals.

The size, cost, and/or power consumption of the sensor, and the amount of data to be transmitted to a data processor from the sensor can thus be reduced substantially, e.g., by 20%, 30%, 40%, 50%, 60%, etc. Typically, the compressed data is reconstructed by the data-processor to obtain a reconstructed image and the reconstructed image may then be processed to extract actionable knowledge or information of interest. The reconstruction process can increase the data processing burden substantially and, as such, the size, cost, and/or power consumption of the data processing system can increase, and the performance thereof can decrease.

SUMMARY

In various embodiments, methods and systems described herein feature techniques that can extract actionable knowledge from compressively sensed data without full reconstruction thereof, thereby minimizing the cost of not only data collection but also data processing. This is achieved, at least in part, by mapping the physical attributes of an object, such as a physical location in a field, physical motion in the field, etc., to a path space that can be associated with the compressed data. The path space can be parameterized according to different types of expected motions of objects. In particular, instead of reconstructing an image from the observed compressed data, a convex optimization is used select one or more points in the path space that are more likely than others to correspond to the observed data. Information of interest, such identification of one or more objects or interest, and characteristics of their respective motions can then be determined from the selected points in the path space.

The computational complexity of this technique is often less than that of techniques processing uncompressed data or those performing full reconstruction of compressed data. Thus, the required computation capacity/power of various embodiments described herein is less than many other systems used for extraction of information. As compressively sensed data is used by various embodiments, relatively efficient (e.g., smaller, less costly, and/or those consuming less power) sensors can be used. In some embodiments, the convex optimization can be performed in a distributed manner and, as such, the compressive sensing and/or data processing can be performed in a distributed manner. In these embodiments, the cost of individual sensors (in terms of size, power usage, manufacturing cost, etc.) in a group or cluster of sensors and/or the cost of individual data processors in a group/cluster of data processors can be reduced even further.

Accordingly, in one aspect, a method is provided for analyzing motions of objects. The method includes performing by a processor the step of: (a1) representing as a first path point in a path space a first expected path of motion of a first point scatterer in a physical space. The first expected path in the physical space may include a number of locations in the physical space. The method also includes (b1) generating by the processor a first steering vector based on a first set of phase shifts at a receiving antenna. The first set of phase shifts corresponds to an association between the first point scatterer and the first path point. In addition, the method includes: (c1) computing by the processor a first field by manipulating several antenna observations using the first steering vector, and (d1) determining by the processor, based on an intensity of the field, whether the first point scatterer traveled along the first expected path.

In some embodiments, the path space includes a parametric space. At least one parameter of the parametric space can be: a position, a linear velocity, and an angular velocity. The representation of the first path point in the path space may include: a three dimensional position vector; a six dimensional vector that includes a three dimensional position vector and a three dimensional velocity vector; or a vector including a six dimensional vector representing rigid body motion and a position vector.

In some embodiments, the receiving antenna includes $N_E$ elements. Each element may be associated with up to $N_F$ frequencies and up to $N_T$ pulses forming a single dwell. Each one of the first set of phase shifts is associated with an antenna element, one of the $N_F$ frequencies, and one pulse. The number of the antenna observations may be less than $N_E*N_F*N_T$. The first expected path of motion of the first point scatterer in the physical space may correspond to a single dwell of the antenna, where the single dwell corresponds to $N_E$ elements, $N_F$ frequencies, and $N_T$ pulses.

In some embodiments, the method may further include: (a2) representing as a second path point in the path space a second expected path of motion of the first point scatterer in the physical space. The second expected path in the physical space may include a number of locations in the physical space. The method may also include: (b2) generating a second steering vector based on a second set of phase shifts at the receiving antenna. The second set of phase shifts may correspond to an association between the first point scatterer and the second path point. The method may also include: (c2) computing a second field by manipulating the set of antenna observations using the second steering vector, and (d2) determining, based on an intensity of the first field and the second field, whether the first point scatterer traveled along the first expected path or the second expected path.

In some embodiments, the method further includes: (a2) representing as a second path point in the path space a second expected path of motion of a second point scatterer in the physical space, where the second expected path in the physical space includes several locations in the physical space. In addition, the method may include (b2) generating a second steering vector based on a second set of phase shifts at the receiving antenna. The second set of phase shifts may correspond to an association between the second point scatterer and the second path point. The method may also include: (c2) computing a second field by manipulating the set of antenna observations using the second steering vector, and (d2) determining, based on an intensity of the second field, whether the second point scatterer traveled along the second expected path. In some embodiments, the method may further include (e) determining via a comparison of the first and second path points whether a rigid body is associated with the first and second point scatters, and (f) determining whether the rigid body traveled along a path in the physical space associated with the first and/or second expected paths.

In another aspect, a system is provided for analyzing motions of objects. The system includes a first processor and a first memory in electrical communication with the first processor. The first memory includes instructions that can be executed by a processing unit including the first processor or a second processor, or both. The processing unit may be in electronic communication with a memory module that includes the first memory or a second memory or both. The instructions in the first memory program the processing unit to: (a1) represent as a first path point in a path space a first expected path of motion of a first point scatterer in a physical space. The first expected path in the physical space may include a number of locations in the physical space.

The processing unit is also programmed to: (b1) generate a first steering vector based on a first set of phase shifts at a receiving antenna. The first set of phase shifts corresponds to an association between the first point scatterer and the first path point. In addition, the processing unit is programmed to: (c1) compute a first field by manipulating several antenna observations using the first steering vector, and (d1) determine, based on an intensity of the field, whether the first point scatterer traveled along the first expected path. In various embodiments, the instructions can program the processing unit to perform one or more of the method steps described above.

In another aspect, an article of manufacture is provided that includes a non-transitory storage medium having stored therein instructions which, when executed by a processing unit program the processing unit, which is in electronic communication with a memory module, to analyze motions of objects. The instructions may program the processing unit to (a1) represent as a first path point in a path space a first expected path of motion of a first point scatterer in a physical space. The first expected path in the physical space may include a number of locations in the physical space.

The processing unit is also programmed to: (b1) generate a first steering vector based on a first set of phase shifts at a receiving antenna. The first set of phase shifts corresponds to an association between the first point scatterer and the first path point. In addition, the processing unit is programmed to: (c1) compute a first field by manipulating several antenna observations using the first steering vector, and (d1) determine, based on an intensity of the field, whether the first point scatterer traveled along the first expected path. In various embodiments, the instructions can program the processing unit to perform one or more of the method steps described above.

According to another aspect, a method is provided for analyzing motions of objects. The method includes performing by a processor the step of generating a set of constraints that includes: (i) a set of observations at a receiving antenna, and (ii) several sets of phase shifts at the receiving antenna. Each set of phase shifts includes phase shifts observable at the receiving antenna corresponding to a point scatterer associated with a respective path point in a set of path points. Each path point may represent in a path space a respective expected path of motion of a point scatterer in a physical space. The method also includes determining by the processor intensity of each path point in the set of path points by exploring a set of fields, where each field corresponds to a respective path point in the set of path points, while satisfying the set of constraints.

In some embodiments, the number of the path points in the set of path points, denoted K, is greater than the number of the observations N at the receiving antenna in the set of observations. Exploring the set of fields may include selecting the set of path points such that a number of near-zero fields in the set of fields is maximized. Exploring the set of fields may include second order cone programming (SOCP).

In some embodiments, the path space includes a parametric space. At least one parameter of the parametric space can be: a position, a linear velocity, and an angular velocity. The representation of a path point in the path space can be: a three dimensional position vector; a six dimensional vector that includes a three dimensional position vector and a three dimensional velocity vector; or a vector that includes a six dimensional vector representing rigid body motion and a position vector.

In some embodiments, the receiving antenna includes $N_E$ elements. Each element may be associated with up to $N_F$ frequencies and up to $N_T$ pulses. Each phase shift observable at the receiving antenna may be associated with an antenna element, one of the $N_F$ frequencies, and one pulse. The number of the observations N at the receiving antenna in the set of observations may be less than $N_E*N_E*N_T$, in some embodiments. Each expected path of motion of the point scatterer in the physical space may correspond to a single dwell of the antenna, where the single dwell corresponding to $N_E$ elements, $N_F$ frequencies, and $N_T$ pulses.

The method may further include identifying a first path, in the physical space, of a first point scatterer, based on the respective intensities of the path points and, optionally, identifying a second path, in the physical space, of a second point scatterer, based on the respective intensities of the path points. The method may also include determining via a comparison of the second path with the first path that both the first and second point scatterers are associated with a rigid body. Moreover, the method may include determining a path of the rigid body according to the first and/or second paths.

In another aspect, a system is provided for analyzing motions of objects. The system includes a first processor and a first memory in electrical communication with the first processor. The first memory includes instructions that can be executed by a processing unit including the first processor or a second processor, or both. The processing unit may be in electronic communication with a memory module that includes the first memory or a second memory or both. The instructions in the first memory program the processing unit to generate a set of constraints that includes: (i) a set of observations at a receiving antenna, and (ii) several sets of phase shifts at the receiving antenna. Each set of phase shifts includes phase shifts observable at the receiving antenna corresponding to a point scatterer associated with a respective path point in a set of path points. Each path point may represent in a path space a respective expected path of motion of a point scatterer in a physical space. The processing unit is also programmed to determining intensity of each path point in the set of path points by exploring a set of fields, where each field corresponds to a respective path point in the set of path points, while satisfying the set of constraints. In various embodiments, the instructions can program the processing unit to perform one or more of the method steps described above.

In another aspect, an article of manufacture is provided that includes a non-transitory storage medium having stored therein instructions which, when executed by a processing unit program the processing unit, which is in electronic communication with a memory module, to analyze motions of objects. The instructions may program the processing unit to generate a set of constraints that includes: (i) a set of observations at a receiving antenna, and (ii) several sets of phase shifts at the receiving antenna. Each set of phase shifts includes phase shifts observable at the receiving antenna corresponding to a point scatterer associated with a respective path point in a set of path points. Each path point may represent in a path space a respective expected path of motion of a point scatterer in a physical space. The processing unit is also programmed to determining intensity of each path point in the set of path points by exploring a set of fields, where each field corresponds to a respective path point in the set of path points, while satisfying the set of constraints. In various embodiments, the instructions can program the processing unit to perform one or more of the method steps described above.

According to another aspect, a method is provided for analyzing motions of objects. The method includes performing by a processor the step of receiving a track model representing a number of candidate tracks of motion of an object in a physical space. The track model may include a time variable and a parameter set, each unique value of the parameter set representing a distinct candidate track in the physical space. The track model is generally valid for several data collection intervals. The method also includes receiving observed data from a sensor, where the observed data is collected from a start time up to an end time. Additionally, the method includes selecting a number of candidate tracks, where each candidate track is represented by the track model and corresponds to a respective selected value of the parameter set. The method further includes generating using a functional a number of sets of expected sensor data from the track model. Each set may corresponding to both a respective one of the selected candidate tracks and a respective value of the parameter set. The method finally includes identifying a candidate track as an expected track by optimizing a relation of the several sets of expected sensor data and the observed data.

In some embodiments, the track model includes or is based on a Kepler gravity model. The track model may include a ballistic track model, and the parameter set of the track model may include a parameter representing total energy of the object, a parameter representing orbital angular momentum magnitude of the object; a subset of parameters representing orientation of an orbit of the object in space; and a parameter representing time of periapsis of the object. The sensor may include a radar, a lidar, or a camera.

In some embodiments, the sensor includes a multi-element radar, and the data collection interval includes a dwell time of the radar. Optimizing the relation may include assigning a probability to each candidate track represented by a respective parameter value such that: across all selected parameter values, a summation of a function of the candidate track probabilities and respective sets of expected sensor data is equal to the observed data within a specified threshold. Optimizing the relation may also include maximizing the entropy of the assigned probabilities. In some embodiments, the optimizing the relation includes selecting a parameter value such that a function of the set of expected sensor data corresponding to that parameter value and the observed data is minimized across all selected parameter values.

The start time may corresponds to a time at which the motion of the object started, and the end time may correspond to a time at which a track of the object is to be determined. A time difference between the end time and the start time may include an integer multiple of a data collection interval.

In another aspect, a system is provided for analyzing motions of objects. The system includes a first processor and a first memory in electrical communication with the first processor. The first memory includes instructions that can be executed by a processing unit including the first processor or a second processor, or both. The processing unit may be in electronic communication with a memory module that includes the first memory or a second memory or both. The instructions in the first memory program the processing unit to receive a track model representing a number of candidate tracks of motion of an object in a physical space. The track model may include a time variable and a parameter set, each unique value of the parameter set representing a distinct candidate track in the physical space. The track model is generally valid for several data collection intervals. The processing unit is also programmed to receive observed data from a sensor, where the observed data is collected from a start time up to an end time.

Additionally, the processing unit is programmed to select a number of candidate tracks, where each candidate track is represented by the track model and corresponds to a respective selected value of the parameter set. The processing unit is further programmed to generate using a functional a number of sets of expected sensor data from the track model. Each set may corresponding to both a respective one of the selected candidate tracks and a respective value of the parameter set. Moreover, the processing unit is programmed to identify a candidate track as an expected track by optimizing a relation of the several sets of expected sensor data and the observed data. In various embodiments, the instructions can program the processing unit to perform one or more of the method steps described above.

In another aspect, an article of manufacture is provided that includes a non-transitory storage medium having stored therein instructions which, when executed by a processing unit program the processing unit, which is in electronic communication with a memory module, to analyze motions of objects. The instructions may program the processing unit to receive a track model representing a number of candidate tracks of motion of an object in a physical space. The track model may include a time variable and a parameter set, each unique value of the parameter set representing a distinct candidate track in the physical space. The track model is generally valid for several data collection intervals. The processing unit is also programmed to receive observed data from a sensor, where the observed data is collected from a start time up to an end time.

Additionally, the processing unit is programmed to select a number of candidate tracks, where each candidate track is represented by the track model and corresponds to a respective selected value of the parameter set. The processing unit is further programmed to generate using a functional a number of sets of expected sensor data from the track model. Each set may corresponding to both a respective one of the selected candidate tracks and a respective value of the parameter set. Moreover, the processing unit is programmed to identify a candidate track as an expected track by optimizing a relation of the several sets of expected sensor data and the observed data. In various embodiments, the instructions can program the processing unit to perform one or more of the method steps described above.

In another aspect, a system for analyzing characteristics of objects includes a number of stations including a first station. The first station includes a sensor and a communication module configured to: (i) receive observations collected by a second station and (ii) exchange data with a third station. The system also includes a processor programmed to solve jointly with the third station, an optimization task having constraints that are based on: (i) observations collected by the sensor, and/or (ii) the received observations. The optimization task may be solved to determine a characteristic of an object. The sensor may include: (i) one or more receiving elements of a radar antenna, (ii) one or more receiving elements of a lidar antenna, and/or (iii) a camera.

In some embodiments, the sensor of the first station includes a first receiving element of a multi-element radar antenna. The second station may include a second receiving element of the multi-element radar antenna. The multi-element radar antenna may have $N_E$ receiving elements, and a dwell period corresponding to $N_T$ pulses, where each pulse includes $N_E$ frequencies. The system may further include the second station and the multi-element antenna. The multi-element antenna may be configured to collect less than $N_E*N_E*N_T$ observations in a single dwell period.

The multi-element antenna may include N receiving elements, where N is greater than or equal to one, and the sensor of the first station is configured to collect observations at a rate not exceeding a fraction of a rate of information associated with the characteristic of the object. The fraction can be 1/N or less. The sensor of the first station and/or the sensor of the second station may include a transmission element of the multi-element radar antenna.

In some embodiments, the communication module is configured to transmit the observations collected by the sensor to the third station. The third station can be the same as the second station. The first may include a database having the location of the third station relative to the first station, and the processor may be programmed to modify at least one constraint based on, at least in part, the location of the third station.

The first station may include a first unmanned aerial vehicle (UAV) and the third station may include a second UAV different from the first UAV. The data may include location data, and the processor may be programmed to: (i) compute a location of the third station relative to the first station, and (ii) modify at least one constraint based on, at least in part, the location of the third station. The data may include, alternatively or in addition, the computation data generated by the processor.

In some embodiments, the sensor is configured to collect observations via a dual-use waveform. The communication module may be configured to: (i) receive the observations and/or (ii) exchange the data, via the dual-use waveform. The dual-use waveform may include: a biphase coded waveform, a biphase coded waveform that includes a pseudorandom sequence of phase shifts, and/or a Costas waveform. The optimization task may include determination of a path of the object and/or an attribute of the object.

In another aspect, a method is provided for analyzing characteristics of objects. The method includes, performing at a first station in a plurality of stations, the steps of: collecting observations using a sensor, and via a communication module: (i) receiving observations collected by a second station in the plurality of stations, and/or (ii) exchanging data with a third station in the plurality of stations. In addition, the method includes solving jointly by a processor and with the third station, an optimization task having constraints that are based on at least one of: (i) observations collected by the sensor, and (ii) the received observations, to determine a characteristic of an object. In various embodiments, the method may perform one or more operations the system described above is configured to perform.

In another aspect, an article of manufacture is provided that includes a non-transitory storage medium having stored therein instructions which, when executed by a processing unit program the processing unit, which is in electronic communication with a memory module, to analyze characteristics of objects. The instructions may program the processing unit to collect observations using a sensor, and (i) receive observations collected by a second station in the plurality of stations, and/or (ii) exchange data with a third station in the plurality of stations. In addition, the processing unit is programmed to solve jointly by a processor and with the third station, an optimization task having constraints that are based on at least one of: (i) observations collected by the sensor, and (ii) the received observations, to determine a characteristic of an object. In various embodiments, the instructions can program the processing unit to perform one or more of the operations the system described above is configured to perform.

In another aspect, a method for analyzing attributes of objects includes performing by a processor the step of: (a) representing as a distribution of path points in a path space the expected paths of motion of a point scatterer in a physical space. Each expected path in the physical space may include a number of locations in the physical space. The method also includes (b) generating by the processor a distribution of steering vectors based on a number of phase shifts at a receiving antenna. The phase shifts may correspond to an association between the point scatterer and the distribution of path points. In addition, the method includes: (c) computing by the processor a field-intensity distribution based on, at least in part, several antenna observations and the distribution of steering vectors, and (d) determining by the processor, based on the field-intensity distribution, a path of a first point scatterer in the physical space.

Computing the field-intensity distribution may include applying adaptive weights to: (i) one or more of the several antenna observations, and/or (ii) the distribution of steering vectors. The adaptive weights may be selected to minimize interference from an interfering point scatterer in the physical space. Computing the field-intensity distribution may include partitioning the path space into first-level regions, computing the field intensity for each first-level region, and selecting a first-level region having maximum field intensity. Computing the field intensity may further include: partitioning path space in the selected region into second-level regions, computing the field intensity for each second-level region, and selecting a second-level region having maximum field intensity. Determining the path in the physical space may include selecting a representative path point within the selected second-level region, and identifying a path in the physical space that corresponds to the representative path point.

In some embodiments, the method further includes determining, based on the field-intensity distribution, a path of a second point scatterer in the physical space. The method may also include determining via a comparison of the paths of the first and second point scatterers that a rigid body is associated with the first and second point scatterers. In addition, the method may include determining the path of the rigid body in the physical space based on the path of the first point scatterer and/or the path of the second point scatterer. The method may also include determining an attribute of the rigid body based on the path of the first point scatterer and/or the path of the second point scatterer. The attribute of the rigid body may include a range, a velocity, and an angular velocity.

In another aspect, a system is provided for analyzing attributes of objects. The system includes a first processor and a first memory in electrical communication with the first processor. The first memory includes instructions that can be executed by a processing unit including the first processor or a second processor, or both. The processing unit may be in electronic communication with a memory module that includes the first memory or a second memory or both. The instructions in the first memory program the processing unit to (a) represent as a distribution of path points in a path space the expected paths of motion of a point scatterer in a physical space. Each expected path in the physical space may include a number of locations in the physical space.

The processing unit is also programmed to (b) generate a distribution of steering vectors based on a number of phase shifts at a receiving antenna. The phase shifts may correspond to an association between the point scatterer and the distribution of path points. In addition, the processing unit is programmed to: (c) compute a field-intensity distribution based on, at least in part, several antenna observations and the distribution of steering vectors, and (d) determine, based on the field-intensity distribution, a path of a first point scatterer in the physical space. In various embodiments, the instructions can program the processing unit to perform one or more of the method steps described above.

In another aspect, an article of manufacture is provided that includes a non-transitory storage medium having stored therein instructions which, when executed by a processing unit program the processing unit, which is in electronic communication with a memory module, to analyze attributes of objects. The instructions may program the processing unit to (a) represent as a distribution of path points in a path space the expected paths of motion of a point scatterer in a physical space. Each expected path in the physical space may include a number of locations in the physical space. The processing unit is also programmed to (b) generate a distribution of steering vectors based on a number of phase shifts at a receiving antenna. The phase shifts may correspond to an association between the point scatterer and the distribution of path points. In addition, the processing unit is programmed to: (c) compute a field-intensity distribution based on, at least in part, several antenna observations and the distribution of steering vectors, and (d) determine, based on the field-intensity distribution, a path of a first point scatterer in the physical space. In various embodiments, the instructions can program the processing unit to perform one or more of the method steps described above.

BRIEF DESCRIPTION OF THE DRAWINGS

In the following description, various embodiments of the present invention are described with reference to the following drawings, in which.

DETAILED DESCRIPTION

Generalized Matched Processing

Figure 1:
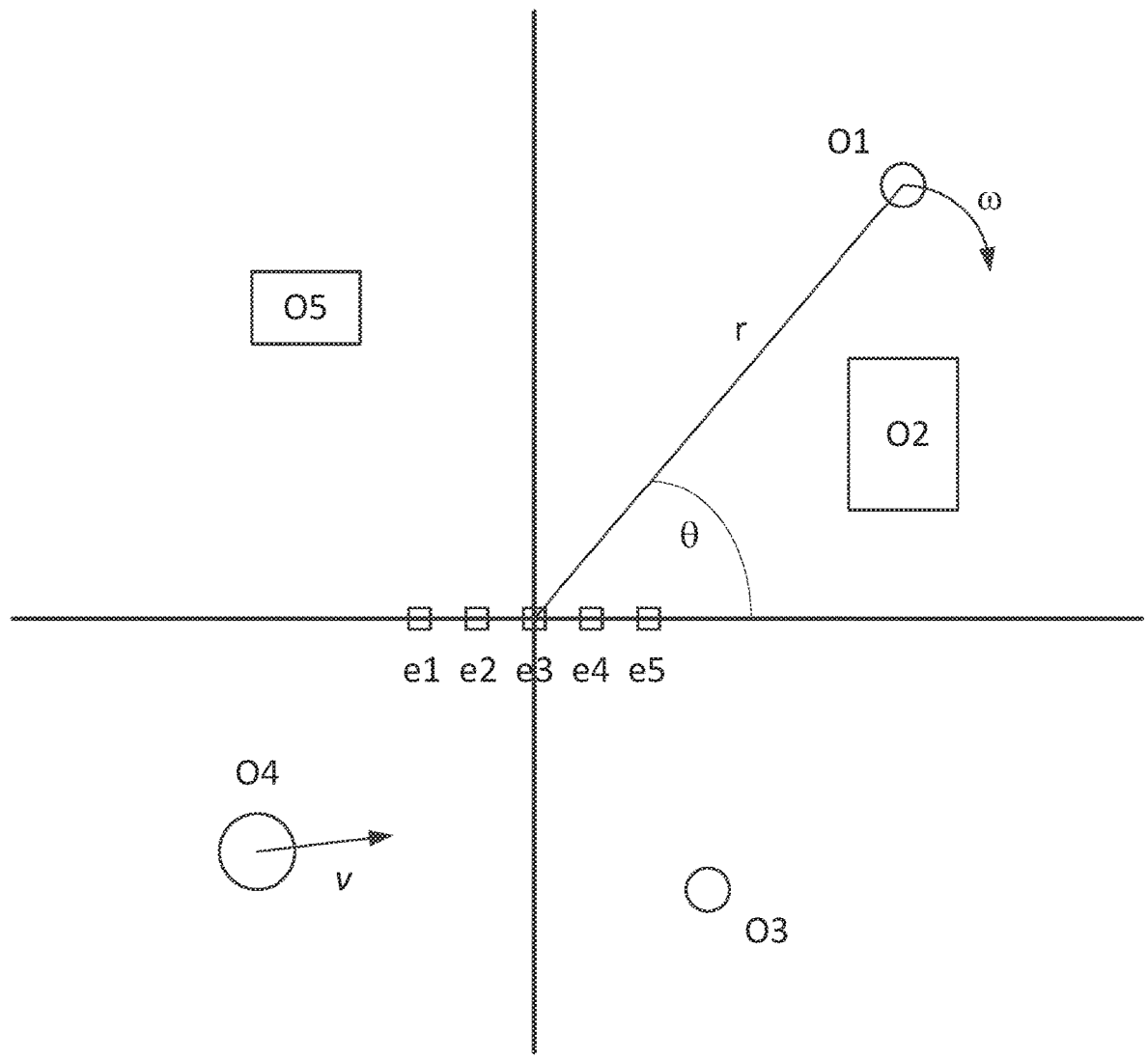
FIG. 1 schematically illustrates a sensor according to some embodiments, and an example observed field having several objects.

The structure of coherent imaging can be expressed in a uniform language, whatever the physical situation. What is needed is a physical model of the phase of the I&Q data at the sensor in terms of a set of physical parameters q. The phase of the radar signal will depend on wideband frequency or sample time (fast time index f), on pulse number (slow time index t) and on array element index e in all the cases of a phased array antenna, a sparse array, or a distributed array comprising multiple physical elements. These integer indices form the discrete measurement space. The complex I&Q data indexed according to these three integers can be viewed as a complex tensor z(f, e, t) with three indices. This tensor is often referred to in the radar literature as the data cube, because it is a tensor-valued complex quantity of rank three.

We use the vector notation z(f, e, t)=⟨f, e, t|z⟩, which expresses the entire set of measurements as a vector |z⟩ in a certain complex vector basis $$\{|f,e,t⟩; f \in \{1 \ldots N\}, e \in \{1 \ldots D\}, t \in \{1 \ldots M\}\}.$$

This basis is just a set of column vectors that contain a 1 in the position corresponding to a given combination (f, e, t)| of the three discrete indices, and a 0 otherwise. This definition of the basis can be written compactly as:

$$⟨f', e', t' | f, e, t⟩ = \delta(f', f)\delta(e', e)\delta(t', t) \quad (1)$$

$$\sum_{f=1}^{N}\sum_{e=1}^{D}\sum_{t=1}^{M} |f, e, t⟩⟨f, e, t| = 1$$

A useful interpretation of this notation is that we are implicitly introducing a single index n that runs over all of the ordered triples (f, e, t). In order to satisfy Equation 1, it is only necessary that this index count each basis vector |f, e, t⟩ exactly once, but this is determined by Equation 1 only up to a permutation n (f, e, t)⇆{f(n), e(n), t(n)}. This permutation is arbitrary, i.e., any combination off e, and t is possible, but it must be remembered. Then we can denote the basis vectors as |n⟩≡|f, e, t⟩, and regard the data cube as a single complex column vector |z⟩ with elements ⟨n|z⟩=z(f, e, t). Substituting the symbol |n⟩ for the symbol |f, e, t⟩ in Equation 1 results in the simplified expressions $$⟨n' | n⟩ = \delta(n', n) \quad (2)$$

$$\sum_{n=1}^{NDM} |n⟩⟨n| = 1.$$

The phase of the I&Q data is defined by a physical model with parameters q. We can write it as ϕ(f, e, t|q) or ϕ(n|q) and introduce a generalized steering vector (a complex row vector) with elements $$⟨q|n⟩ = \exp(-i\phi(n|q)) \quad (3)$$

The image σ(q) is a real, positive density in the space of generalized coordinates (parameters of the phase functional) labeled by q.

$$\sigma(q) = \left|\sum_n z(n)e^{-i\phi(n|q)}\right|^2 = ⟨z|q⟩⟨q|z⟩ \quad (4)$$

If the phase model and the hypothesized parameters q match those of a scatterer in the scene, the image in the multidimensional space q will have a maximum at the coordinates of that scatterer, on account of term-by-term phase cancellation in the coherent sum. We refer to the multidimensional space of generalized coordinates as path space, because to each point in this space there corresponds one hypothetical path of the scatterer throughout the coherent dwell.

With reference to FIG. 1, an illustrative sensor array has 5 elements—e1 through e5, i.e., $N_E$=5. A single coherent dwell may include 10 frequencies, i.e., $N_F$=10, and 8 pulses, i.e., $N_T$=8. Accordingly, N=$N_E$*$N_F$*$N_T$=400. It should be understood that these array parameters are illustrative only and that in general an array can have any number (e.g., 1, 2, 5, 8, 10, 20, 50, etc., or more) of transmitter and receiver elements. A single coherent dwell may include any number of frequencies (e.g., 2, 6, 8, 10, 15, 30, 40, etc., or more), and any number of pulses (e.g., 2, 5, 8, 12, 25, 30, 45, etc., or more).

In one example, the observed field includes five objects O1 through O5. The object O1 is a moving vehicle (e.g., a truck). The location of O1 at one instant can be specified by (r, θ). O1 is moving in a circle around the element e3 at an angular velocity ω. The object O2 is a building. The object O3 is another truck, but it is not moving. The object O4 is a big vehicle (e.g., a ship) moving in a straight line at a velocity v, and the object O5 is a tree. This example is illustrative only and that in general, an observed field may include any number (e.g., 1, 2, 7, 10, 12, 15, 35, etc., or more) of objects, one or more of which may be stationary and/or moving. One or more objects may move in different manners such as traveling along a straight path, curved path, meandering, rotating, tumbling, etc. The observed field, or the physical space, can be two dimensional or three dimensional.

Each of these target objects may be associated with one or more point scatterers in various geometrical arrangements. A point scatterer, in general, is a point of reflection. In some phase models (point scatterer models) a target object can be well modeled as a collection of point scatterers. A scatterer that is rigidly attached to an object derives its motion relative to the radar from two sources (1) the motion of the rigid object about its center of mass and (2) the relative motion between the radar and the target center of mass. Using these two motions and the motion of the point scatterers associated with a rigid object, the motion of that object can be determined.

As described above, the set of parameters q can describe the path a particular point scatterer can take over time. Since q defines a space-time path, we refer to q as the scatterer's generalized coordinates. As some examples of generalized coordinates, for stationary scatterers, q can be a three-dimensional position vector x, which describes the scatterer position at all times. For scatterers in linear motion, q=(x0, v) can be a six-dimensional vector including the scatterer's position x0 at some reference time and the three-dimensional velocity vector v. For scatterers attached to a rigid body in torque-free motion, the parameters of the path space q=($\Omega$, $s_b$) include the motion parameters $\Omega$ and a position vector $s_b$. The vector $\Omega$ contains six parameters to describe the motion of the body's center of mass as well as parameters that describe the motion of the body's principal axes in space. The vector $s_b$ describes the position of the scatterer relative to the principal axes of the rigid body.

The motion of point scatterer(s) associated with the object O1 can thus be represented as one point in a path space representing angular motion. The point scatterers associated with the objects O2 and O3 can be represented as different points in a path space representing stationary objects. The point scatterers associated with the object O4 can be represented as a point in a path space representing linear motion. Each of these motions is expected to occur during a coherent dwell period.

Summation and integration being linear operators, we can exchange sums in Equation (4) and write:

$$\sum_k w_k \sigma(q_k) = \sum_k w_k \langle z | q_k \rangle \langle q_k | z \rangle = \langle z | \left\{ \sum_k w_k | q_k \rangle \langle q_k | \right\} | z \rangle \quad (5)$$

$$\int w(q) \sigma(q) dq = \langle z | \left\{ \int dq | q \rangle w(q) \langle q | \right\} | z \rangle \quad (6)$$

which expresses the weighted sum of the image at a discrete set of points in the path space, or the weighted integral of the image over a region or ball in path space, as a sandwich product of a certain computable matrix between the conjugate transpose of the radar data (row vector) on the left and the radar data (column vector) on the right. Equations (1) through (6) indicate one technique for extracting important information from images while performing much less computation than those needed to reconstruct and evaluate the entire image from the collected data.

The notion of an object during a coherent dwell period can be determined as follows. One or more point scatterers, that can reflect radar signals back to the receiving elements of an antenna as assumed to be associated with one or more objects. A path space is generated in terms of the parameter set q for one or more point scatterers. Each point in the path space may represent a respective motion of a corresponding point scatterer in the physical space. The path space can be a continuum or may include a set of discrete points.

For any particular point in the path space, represented by a value of q, a set of phases of the I&Q data of the receiving elements of the antenna can be computed using Equation (3). These data represent the I&Q signals the receiving elements of the antenna would receive if a point scatterer were to actually travel along a physical path represented by the value of q in the path space. Such sets of phases of the I&Q data can be called steering vectors, which can be continuous functions of the q space is continuous, or discrete vectors, one corresponding to each discrete value of q.

A field can be illuminated by manipulating the steering vectors using the signals actually observed at the receiving antenna elements, the observed signal being denoted by z(n) and one manipulation being represented by Equation (4). In the field thus illuminated, the values of q that correspond to actual point scatterers have relatively high intensity that values of q that do not correspond to any actual point scatterers.

Thus, the illumination of the field using the observed radar data z(n) can be used to identify actual point scatterers in the target physical space and to determine physical paths of such point scatterers. If two or more point scatterers have coordinated paths, it can be inferred that those point scatterers are associated with a rigid body such as a vehicle. The motion of the rigid body can be determined from the physical path(s) of the one or more corresponding point scatterers.

Generalized Adaptive Processing

Adaptive weights are generally known in radar from Space Time Adaptive Processing (STAP) in which these weights are used to deeply null ground clutter to improve the detectability of moving targets against a strong stationary background. Adaptive weights appear in a more general form in our GMAP framework that allows this scheme to be extended and improved.

When weights are included in the coherent sum, Equation 4 becomes:

$$\sigma(q) = \left| \sum_n w(n) z(n) e^{-i\phi(n|q)} \right|^2 = \langle w | q \rangle \langle q | w \rangle \quad (7)$$

On the left, we have pulled the measurement vector z(n) into the definition of the vector |q⟩ to emphasize the important role of the adaptive weights |ω⟩. The new definition of the vector |q⟩ including the measured data z is $$q_n = \langle n | q \rangle = z(n) e^{-i\phi(n|q)} \quad (8)$$

If the weights are real, they do not affect the positions of peaks in the path space q, but only modify the sidelobes and the resolution of the image. If they are complex, they are capable of modifying the image in any way, including emphasizing peaks or creating nulls. This requires a variational principle for designing adaptive weights. To obtain this variational principle, we suppose that classes of targets are defined according to class-conditional probability densities over path space. Let the targets we wish to detect have probability p(q|S) for signal and the classes we wish to suppress have probability p(q|I) for interference. The projection operator corresponding to the signal class $\hat{S}=\int dq|q\rangle p(S|q)\langle q|$ and the operator corresponding to the interference class is $\hat{I}=\int dq|q\rangle p(I|q)\langle q|$.

Figure 2:
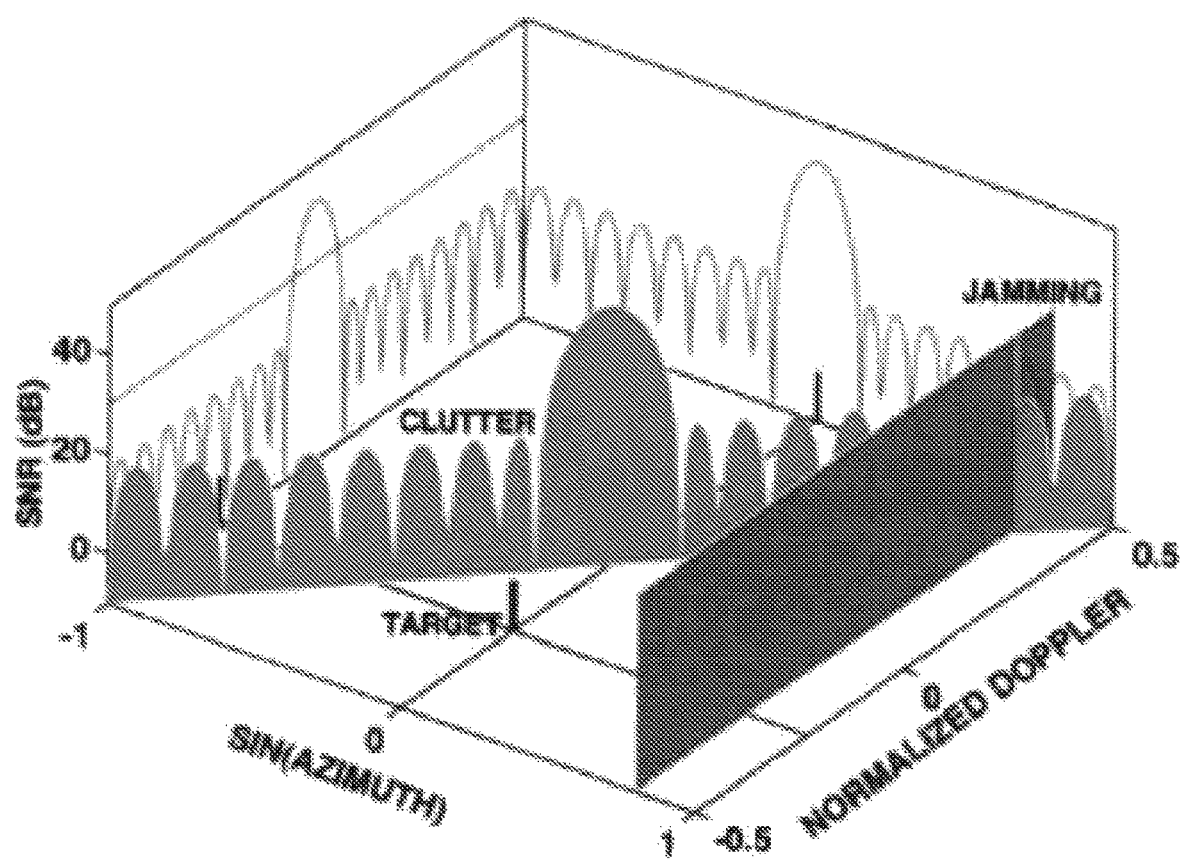
FIG. 2 illustrates adaptive nulling of stationary ground clutter confined to a clutter ridge in joint angle-doppler space and jamming, to detect moving targets, according to some embodiments.

To find the weights that detect the signals and suppress the interference, we need to maximize the signal-to-interference ratio defined by:

$$SINR = \frac{\langle w|\hat{S}|w\rangle}{\langle w|\hat{I}|w\rangle} \quad (9)$$

subject to $\langle \omega | \mu \rangle = 1$. The variational principle in Equation 9 is derived formally using Bayes rule. The complex weights $|\omega\rangle$ can be calculated as the eigenvector of the matrix $\hat{I}^{-1}\hat{S}$ belonging to the maximum eigenvalue, which is then the SINR. An alternative procedure is to use convex optimization to find the weights. This type of mathematical optimization may involve a complex generalized Rayleigh quotient To briefly summarize the conventional STAP signal processing technique for airborne moving target detection, it is assumed that the antenna is a uniform linear array (ULA) that in the simplest case moves colinearly with the surveillance aircraft. In this restricted case, it is sensible to speak of target radial velocity as velocity projected onto the array normal, and target angle as the angle of the target off the array normal, so that the round trip phase of a monochromatic signal of frequency f for a pulse emitted at time t from element e can be written in a simple functional form as $\phi(f,e,t|r,v,\theta) = \phi(n|r,v,\theta)$. It is observed that stationary clutter on the earth at a range R is concentrated on a diagonal ridge in the joint transform space angle-doppler as illustrated in FIG. 2. Adaptive weights over element index and pulse time are used to place a deep null on the stationary clutter ridge to render the moving target detectable.

In Generalized Match Processing, the array may not be linear, and having no boresight, neither the concept of radial velocity nor the concept of angle off the array has any meaning. But a scatterer at position (x, y) in the ground plane moving with velocity $(v_x, v_y)$ can be unambiguously represented. For calculating the adaptive weights, it is necessary to substitute the four-dimensional path-space $q = (x, y, v_x, v_y)$ for the three-dimensional path space $q = (r, v, 0)$ that appears in conventional STAP.

Figure 3:
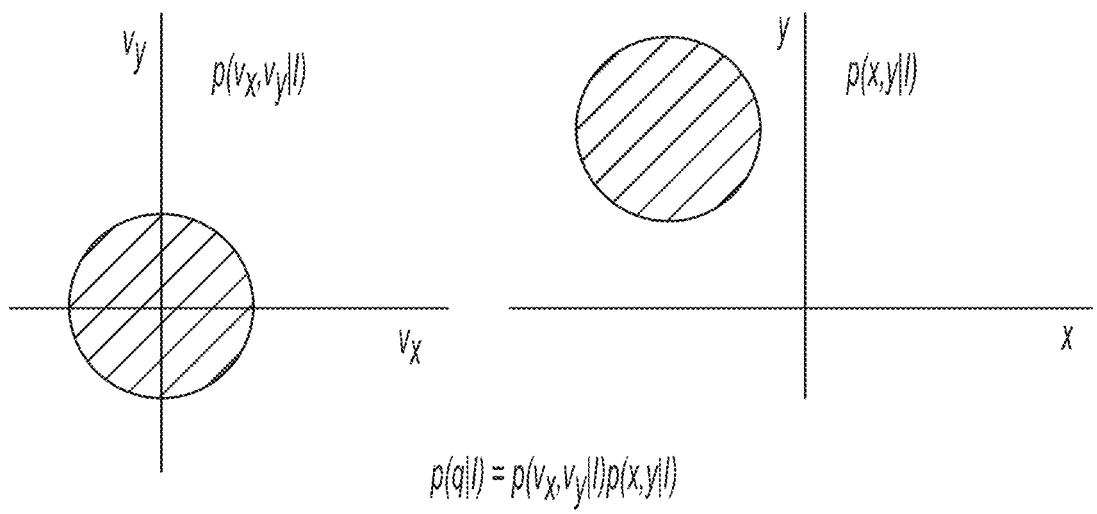
FIG. 3 depicts a hard-walled four-dimensional class-conditional probability density for a clutter class, according to some embodiments.
Figure 4:
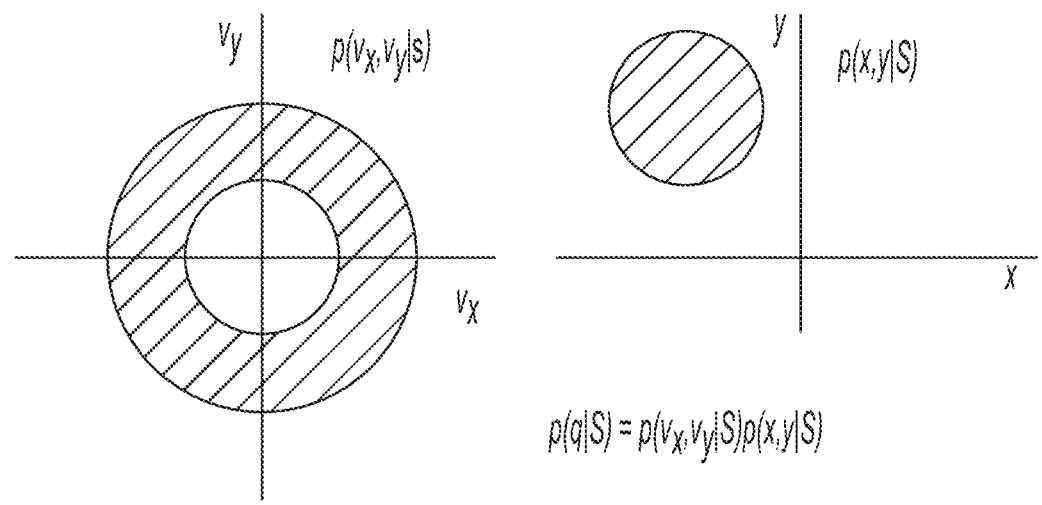
FIG. 4 depicts a hard-walled four-dimensional class-conditional probability density for a target class, according to some embodiments.

FIG. 3 illustrates an example conditional probability distribution for the clutter class I. The illuminated footprint on the ground is shown on the right, and the region of velocity space to be nulled is shown on the left. Class-conditional probability density for a clutter class is described as having net speed below a threshold (as illustrated on the left) and position within a specified footprint on the ground (as illustrated on the right. FIG. 4 shows a corresponding conditional density for the target class S. Class-conditional probability density for a target class is described as having net speed above the clutter threshold (as illustrated on the left) and position within a specified footprint on the ground (as illustrated on the right). The meaning of these densities is that the weights will be chosen to null targets in a steered footprint on the ground near zero speed and detect targets in the same footprint on the ground with speed greater than the cutoff speed. These class probability densities can be used in GMAP to define the class operators $\hat{S}$ and $\hat{I}$, and the adaptive weights $|\omega\rangle$ over the measurement. GMAP can also be used to determine the physical paths of point scatterers and objects as described above. In fact, the adaptive weights can be used to suppress interference or clutter.

Target Attribute Extraction

Figure 5:
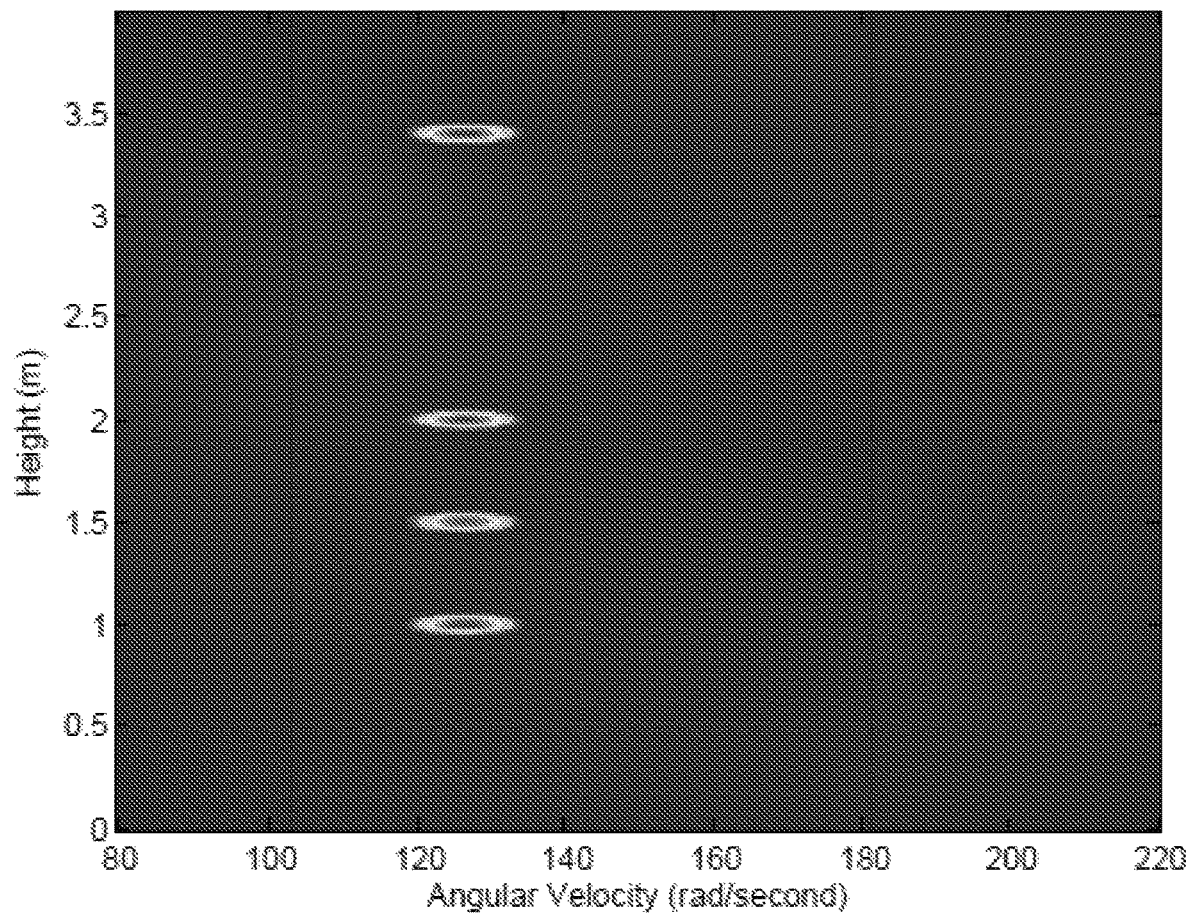
FIG. 5 depicts a radar image of a stopped truck with running engine in the generalized coordinates of height and vibration frequency, according to some embodiments.

FIG. 5 is an illustration of how GMAP can help facilitate persistent, automatic ground target track. Radar data was simulated for a 13-foot tall truck with four discrete scatterers at heights of 1 m, 1.5 m, 2 m and 3.5 m. A 94-GHz radar with bandwidth 2 GHz was placed above the truck in this simulation. The truck was modeled as completely stationary except for a small vertical vibration at a rate of 20 Hz with an amplitude of 1 cm. This simulates, for example, a vehicle stopped at an intersection with the engine running.

The frequency of 20 Hz is characteristic of the mass of the truck and the stiffness of the vehicle suspension. The running engine provides a source of mechanical noise to excite the resulting damped mass-spring system. The phase of the round-trip radar signal is determined by the height of a scatterer above the ground and the characteristic frequency of the forced, damped oscillations, which formed a pair of generalized coordinates $q=(z,\omega)$. The figure shows the image $\sigma(z,\omega)$ of the stopped truck calculated from the simulated radar data with an integration time of 0.013 seconds at a pulse-repetition frequency (PRF) of 2 kHz. This image was calculated from the simulated 94 GHz radar pulse data by applying Equation 4.

Two features of the image are apparent. First, the vertical features of the truck are sharply imaged and are not smeared out in any way by the sinusoidal motion. Second, even though the vibration of the truck is so small (1 cm vertically at a rate of 20 Hz), the angular rate of this resonance (125 rad/second) is readily seen in the image, and is expressed in the motion of each of the scatterers independently.

Figure 6:
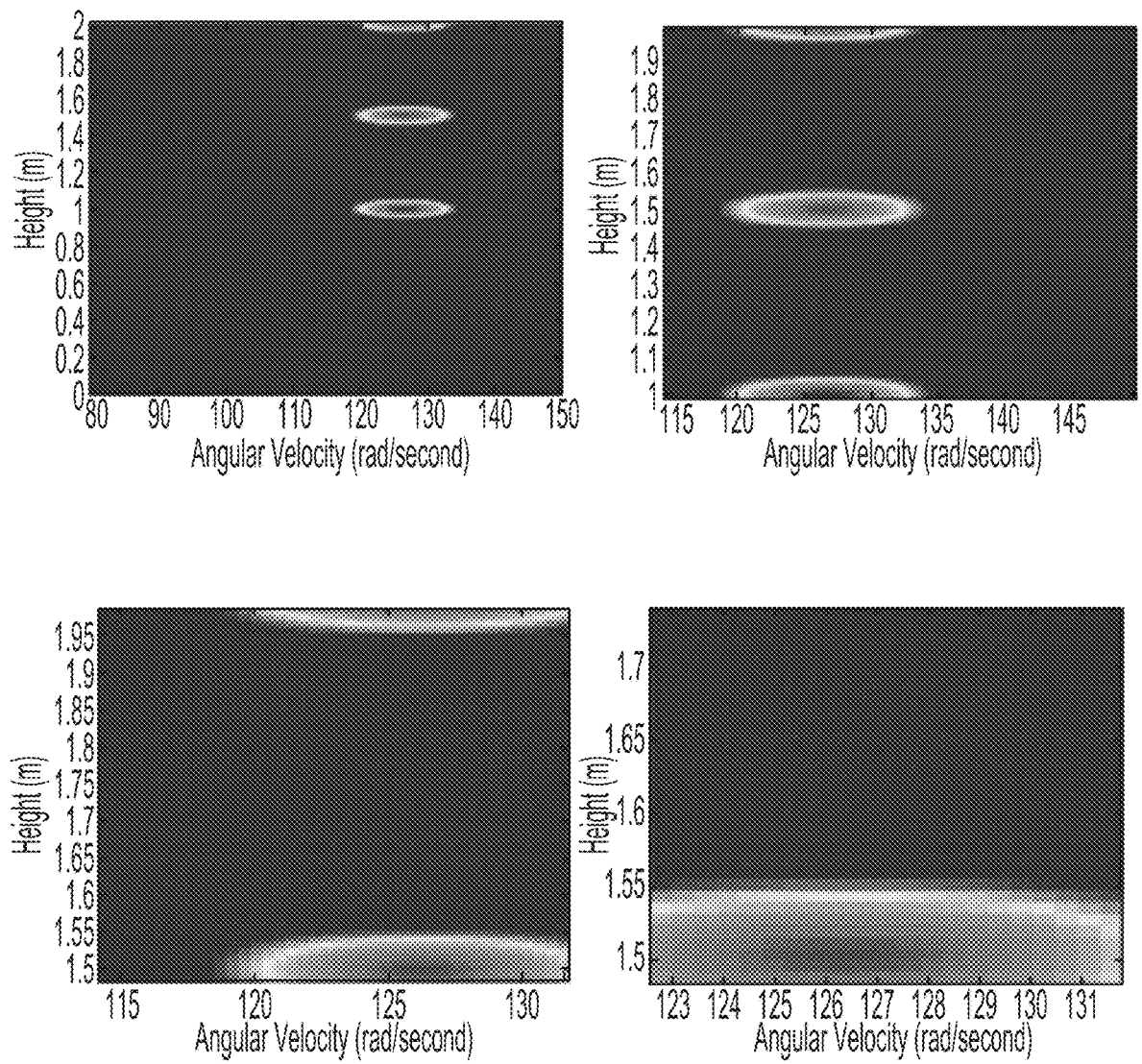
FIG. 6 illustrates a multiresolution computation of the correct vibrational frequency parameter, according to some embodiments.

The GMAP approach was used to perform the estimation of the vibrational frequency without actually evaluating or reconstructing the radar image, as illustrated in FIG. 6. Evaluation of the total energy contained in a tile which can be a quadrant or a subquadrant is accomplished via a single matrix-vector multiply, represented by the computation of Equation (6). Multiresolution parameter estimation takes place in four passes in some embodiments. First, the entire image is divided into four quadrants. The quadrant with the highest total energy is chosen, and the other three are set aside. This process is iterated three more times for a total of 16 matrix-vector multiplies, after which the vibrational frequency parameter is estimated to better than one part in 100.

The simple example illustrates the revolutionary power of our GMAP framework to extract more than just position and velocity of a target at the moment of detection. This power to expand the palette of detection-level features to encompass discriminating attributes of targets, on a per-detection basis, is the key to establishing and maintaining tracks on ground targets. The advantage may be compared to the difference between color and black and white. The subtle colors (target attributes) that can be used to associate detections with targets make the difference between a completely confused scene in which tracks must be formed from subtle patterns of dots to one where multitarget, multisensor tracking is hardly more difficult than connecting dots.

Convex Optimization for Compressive Sensing

To see the role of convex optimization in compressive radar computations, in some embodiments we first imagine the path space of generalized coordinates to be populated with a set of discrete sampling points $q_k$, where $k \in \{1 \ldots K\}$ is an index running over the sample points. The concept of a discrete sampling in the path space q may apply to any radar signal processing problem where it is possible to write the phase as a function of the measurement indices and a set of generalized coordinates. If $n \in \{1 \ldots N\}$ is a single index that runs over all of the measurement dimensions as described above, we can identify a complex N×K matrix A with elements $$A_{nk} = e^{-i\phi(n|q_k)}, \quad (10)$$

Often K is much larger than N.

We describe a complex column vector $\Phi$ of length K according to:

$$\sigma(q_k) = |\Phi(q_k)|^2 = \Phi_k^* \Phi_k. \quad (11)$$

Therefore, Equation (4) can be rewritten $Az = \Phi$. The significant generalizations are: (1) The phase is no longer required to be affine in the generalized coordinates q, and (2) The number of sample points K is not related to the number of measurements N. In a typical case, there are more generalized coordinates than measurement dimensions, so the mapping from measurements to image is not a transform in the ordinary sense. It is a one-to-many mapping. Nonetheless, Equation $Az=\Phi$ allows us to recast the imaging equation in the form of a matrix-vector multiply. We do not know, however, the actual physical paths of actual point scatterers in the target region. In other words, the path points $q_k$ in the path space that correspond to the actual physical paths of actual point scatterers, i.e., $A_{n,k}$ are not known. Different candidate values of $A_{n,k}$ can result in different $\Phi$ vectors corresponding to a particular set of radar observations.

It is possible to adopt a completely different view of imaging that is more closely related to tomography than to Fourier analysis. For this purpose, we picture the values $\Phi_k$ of the complex image at a set of sample points to physically represent moving point scatterers in the scene. In other words, we replace our original concept of the radar scene as a transformation of electromagnetic signals with the concept of the scene as a set of delta functions in the path space q. The aim of imaging, in this view, is to estimate the values of the model parameters $\Phi_k$. The $n^{th}$ sensor measurement $z_k(n)$ that would result from the presence of a delta function $\Phi_k$, viewed as a bit of complex RCS at generalized image position $q_k$, is:

$$z_k(n) = \Phi_k e^{+i\phi(n|q_k)} \qquad (12)$$

At the same level of approximation that we have adopted all along (single scattering from each point without second bounce) we model the measurements $z_n$ as the sum of scattering from each of the delta functions at points $q_k$. Equating the actual measurement vector $z_n$ with this tomographic model, we have:

$$z = A^\dagger \Phi, \qquad (13)$$

where the symbol $A\backslash$ denotes the complex conjugate transpose of the generalized matrix given by Equation 10. Equation 13 has the form of a system of complex linear equations, one equation for each measurement $z_n$. This system of equations is already under-determined in cases of practical interest, and it will be more so if some of the measurements are not present. Nonetheless, it is possible to obtain the sparsest solution vector $\Phi$ that is consistent with the equations. In some embodiments, they can be achieved by minimizing the $\ell_1$-norm of the solution subject to the linear equations, taken as constraints.

This problem is different than standard compressive sensing problems, which can be solved by linear programming, because the correct $\ell_1$-norm of a complex vector is not the sum of absolute values of real numbers but the sum of moduli of complex numbers. In some embodiments this problem is recast as a Second Order Cone Program (SOCP). SOCP is a more general type of convex optimization than linear programming, and is capable of solving a very wide variety of convex optimization problems. A fairly exhaustive list of SOCP-solvers includes native MATLAB solvers SeDuMi and SDPT3, commercial solvers Gurobi and MOSEK, and three new embedded solvers written in C: Embedded Cone Solver (ECOS), Primal Dual Operator Splitting solver (PDOS), and Splitting Cone Solver (SCS). It should be understood that SOCP is a technique for solving optimization problems just as L-U decomposition is a technique for solving a system of linear equations or gradient projection is a technique for solving nonlinear equations. SOCP solutions at large do not determine intensities of paths. To that end, physical paths must be mapped to a path space, and constraints corresponding to the mapped paths based on antenna observations must be generated.

The Generalized Compressive Processing (GCP), i.e., compressive radar signal processing in terms of convex optimization, can be applied to many radar signal processing problems where the reflection phases of candidate scatterers can be modeled physically with a phase function $\phi(n|q)$ involving parameters q. The situations where GCP formalism can be applied include beamforming, SAR, ISAR, STAP, GMTI, bistatic and multistatic radar, as well as entirely new types of radar sensing according to some embodiments that make use of models of target attributes, as described above.

The following example illustrates the application of GCP to a problem in imaging. This problem is relevant because (1) it has immediate physical significance (2) the phase function is not affine and (3) the path space q of generalized coordinates has a higher dimension than the measurement vector, and includes nonlinear scatterer motion. These are all features of GCP that make it more general than existing compressive radar approaches.

Figure 7:
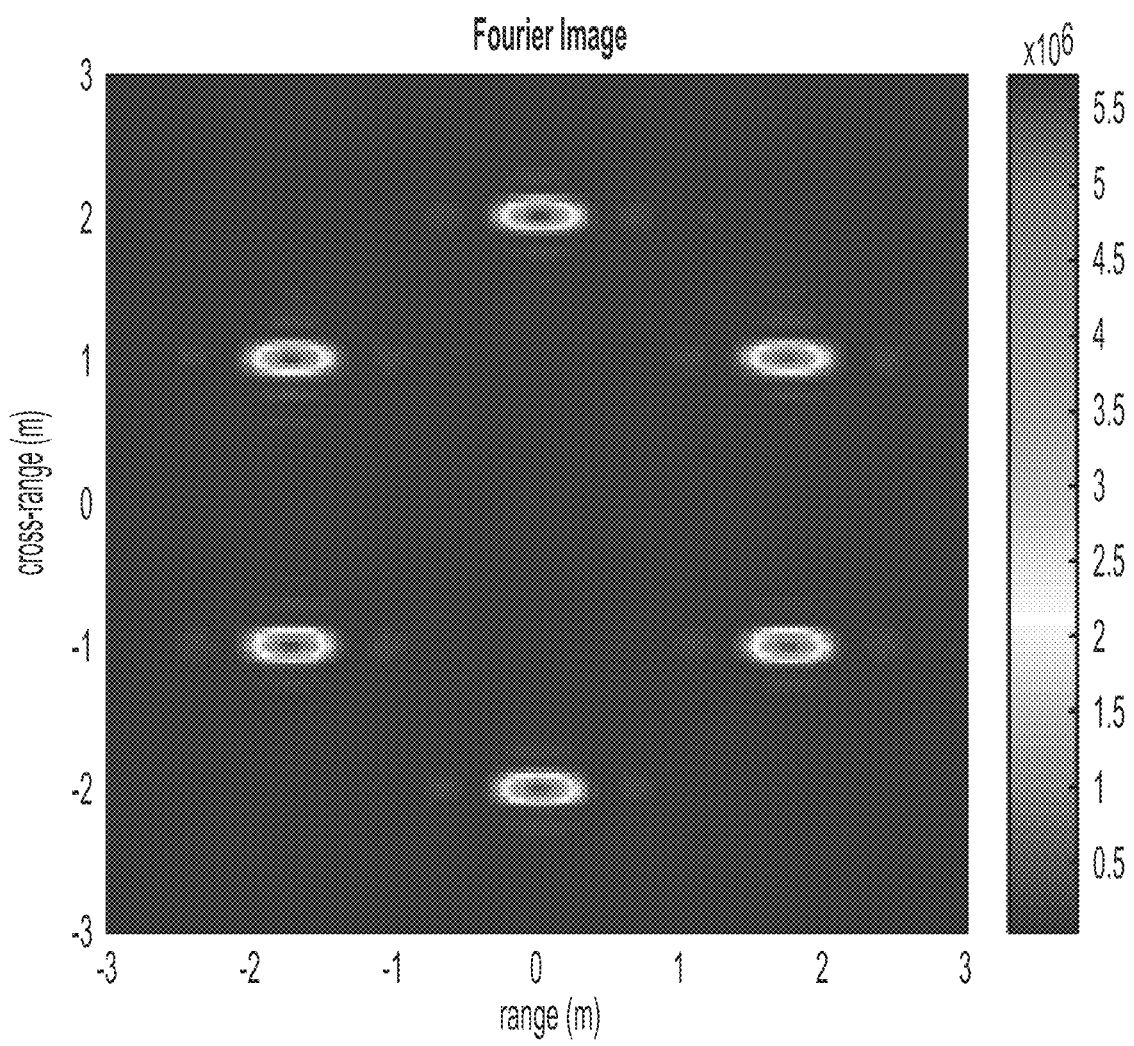
FIG. 7 shows an image $\sigma(r, \theta, \omega)$ of a rotating scatterer ring, processed according to one embodiment.

FIG. 7 shows the image of a rotating rigid structure having six scatterers arranged in a ring with a radius of 2 meters. The phase model corresponding to rotating scatterers is:

$$\phi(f,t|r,\theta,\omega) = r\cos(\omega t + \theta) \qquad (14)$$

This image $\sigma(r, \theta, \omega)$ was created using the GMAP technique described by Equation 4. The ring is rotating at an angular velocity $\omega$ of 2.72 radians/seconds, with the radar located in the far field in the plane of the scatterers. The sensor is modeled as an S-band radar with a center frequency of 3.0 GHz, 300 MHz bandwidth, a pulse repetition frequency of 500 Hz, a pulse width of 0.1 microseconds and a coherent dwell time of 0.1 seconds. These parameters correspond to a radar that is very modest by imaging standards, but GMAP already produces a high quality image using a single matrix-vector multiply.

Figure 8:
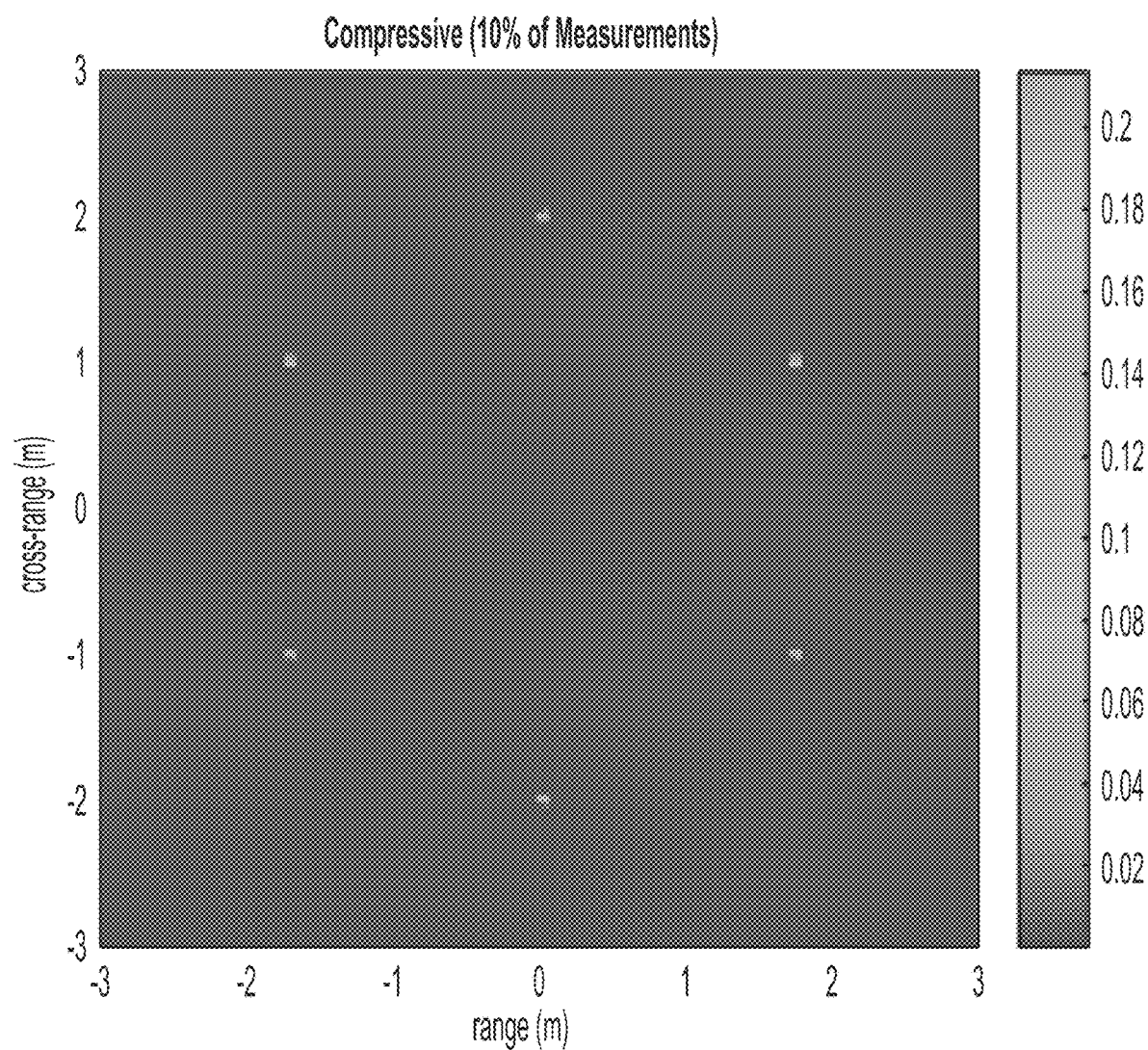
FIG. 8 shows an image $\sigma(r, \theta, \omega)$ of a rotating scatterer ring, processed according to another embodiment.

FIG. 8 shows the result of processing the same radar data using the GCP algorithm based on Equation 13, but taking only 10% of measurements taken at the Nyquist rate. The impulses in path space $q=(r, \theta, \omega)$ are recovered exactly in this case, while reducing the sensor measurements and required communication capacity by 90%.

Convex Optimization for Tracking

The GCP approach described above is well suited for tracking application of ground-based targets. We now describe a framework for the application of convex optimization to the unique problems of multisensor tracking. As an illustrative, nonlimiting example, we describe some embodiments in which tracking is performed using the entropy maximization technique to solve the problem of orbital track reconstruction and discrimination from radar data. In particular, we utilize radar returns over a much longer observation window (minutes and tens of minutes—not seconds) as is done in many other systems, in which data from only a single data collection period such as a coherent dwell is used for greatly improved integrated tracking and discrimination. Using the collected data, we extract key information related to the ballistic motion of a launched object by working in a state-space of orbital invariants. The dynamic tracking problem is reduced to static non-linear optimization. In various embodiments, time is not measured by the counting of measurements, or by seconds on a clock, but by the accumulation of information from measurements. This allows us to employ non-linear static constrained minimization that we can achieve using convex optimization techniques.

Many current trackers are based on track filtering that was originally developed for air targets. This has led to a mental attitude that data become "stale" after a short time such as a data-collection interval, typically measured in seconds. Properly understood, this attitude is inappropriate to tracking in a model-based setting. Measurements are equally valid and useful from the beginning of the engagement to the end. Every measurement provides new information that should be converging to the most correct decision. Track time or measurement time has very little fundamental significance. In many conventional systems, tracking is viewed as a real-time activity where high priority is given to the newest measurements and older measurements (more than a few seconds old) are ignored.

Figure 9:
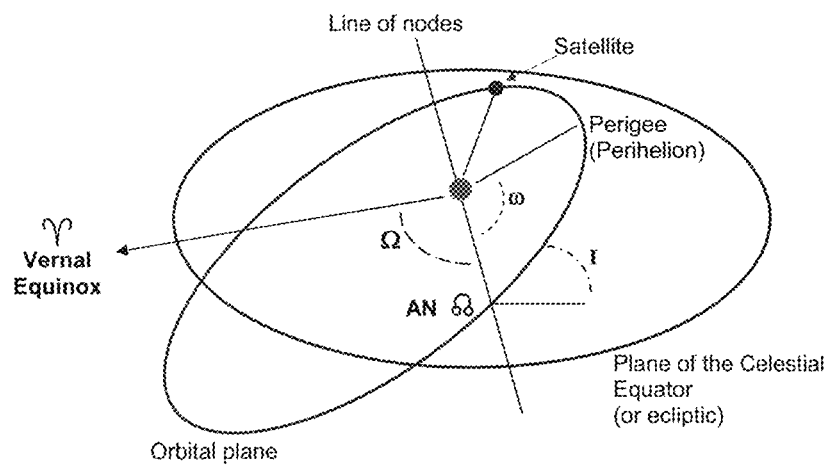
FIG. 9 schematically shows the track of a ballistic target, characterized for many minutes by a handful of orbital invariants, according to some embodiments.

Some embodiments described herein do not ignore or underweight older measurements and, instead, feature a long time-scale multi-target model-based tracking concept that is more closely related to the problem of parameter estimation than to traditional track filtering based on recursive least squares by working almost entirely in the space of track invariants rather than traditional state-space. FIG. 9 underscores this theme. The track of a ballistic target is not an ephemeral object but an invariant structure in space and time.

A ballistic trajectory can be described in various ways. One simple and direct description is in terms of the complete set of six invariants that appear in the solution of the orbital problem in classical mechanics. For example, a model of a track can be the Kepler $1/r^2$ gravity model for a small satellite orbiting the Earth. For improved accuracy (e.g. for times on the order of more than tens of minutes, or for very fast satellites), there exists an exact closed-form solution that accounts for the oblateness of the Earth in the second and third orders, that may be used.

The six invariant physical quantities that are needed to describe a ballistic orbit are: (1) The total energy E; (2) The orbital angular momentum magnitude L; (3-5) The orientation of the orbit in space (expressed, for example, as three Euler angles or a direction cosine matrix referred to ECI coordinates); and (6) The time of periapsis referred to UTM. The classical state-space (x,v) that describes the motion of a tracked target is six dimensional. It implicitly assumes uniform rectilinear motion, and is valid only over sufficiently short time scales (a few seconds). The gravitational force can be handled to leading order by adding three additional acceleration states to this model, as is often done. The additional states are redundant, since the orbit of any object in ballistic freefall is determined entirely by six invariant parameters, as listed above.

Figure 10:
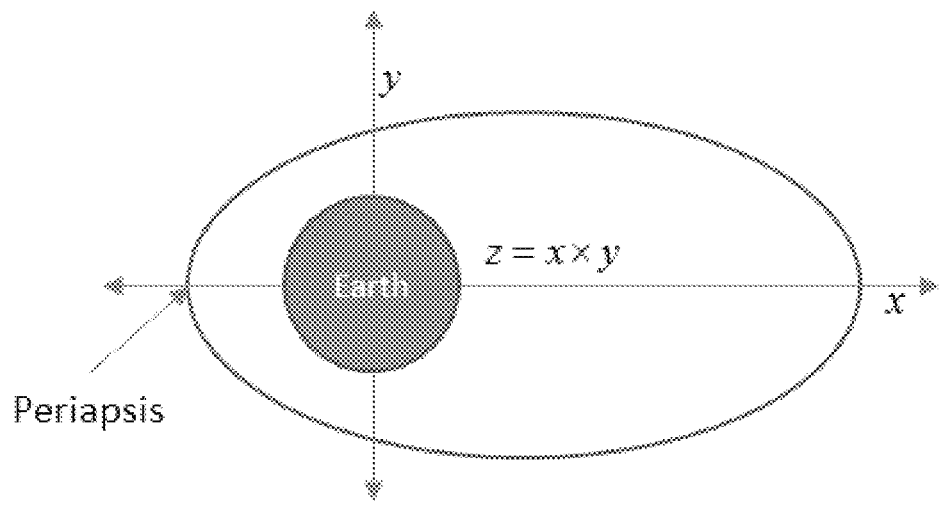
FIG. 10 depicts one particular example of an orbit-fixed reference frame.

To enumerate the invariants, we first represent a system of Cartesian coordinates that is uniquely fixed in the orbit. This is possible because an elliptical orbit, as long as it is eccentric and not circular, represents a completely orientable object in three-dimensional space. FIG. 10 illustrates one unique definition of an orbit-fixed frame of reference. The x-axis is oriented along the long axis of the ellipse, the y-axis is oriented along the short axis, and the z-axis is the cross product of the two. This defines a three-dimensional reference frame O that is fixed by the orbit itself.

The transformation between this orbit-fixed frame and an inertial frame (the Earth-centered inertial frame E) is described by a 3×3 orthogonal matrix [O E]. The three angles $(\theta,\phi,\psi)$ that are needed to describe this rotation are the three Eular angles the six orbital invariants. One fourth of the model is the time Tat which the object passes through periapsis, as measured in universal standard time (UTM). The other two may be the semi-major and the semi-minor axis of the elliptical orbit. They are related in an elementary way to the orbital angular momentum L and the total energy E, which are invariant on physical grounds (the orbital system as a whole is not subject to any external torques or forces).

The six invariant coordinates $q=\{L,E,\theta,\phi,\psi,T\}$ fix the position of the target object at any time, but they form a better state space for tracking than the traditional one based on position and velocity, since a specific orbit is now nothing but a point in the space, to be estimated based on measurements. This can be viewed as a parameter estimation problem and not a tracking problem in the ordinary sense. The state of the system is fixed and does not evolve over time, as does the state of a target when referred to the conventional state space.

Probability enters the picture in this situation because we lack perfect knowledge of this state. Our state of knowledge of the target scene is expressed by a probability density function $p(q)=p(L,E,\theta,\phi,\psi,T)$. This probability density is determined by the measurements, but is no longer tied to the order in which the measurements were acquired. The ultimate aim of the tracker is to estimate the six invariant coordinates of each tracked object, given only the measurements. Because the states are invariant in this formulation, we see that this problem is better characterized as an optimization problem than as tracking in the more familiar sense.

Figure 11:
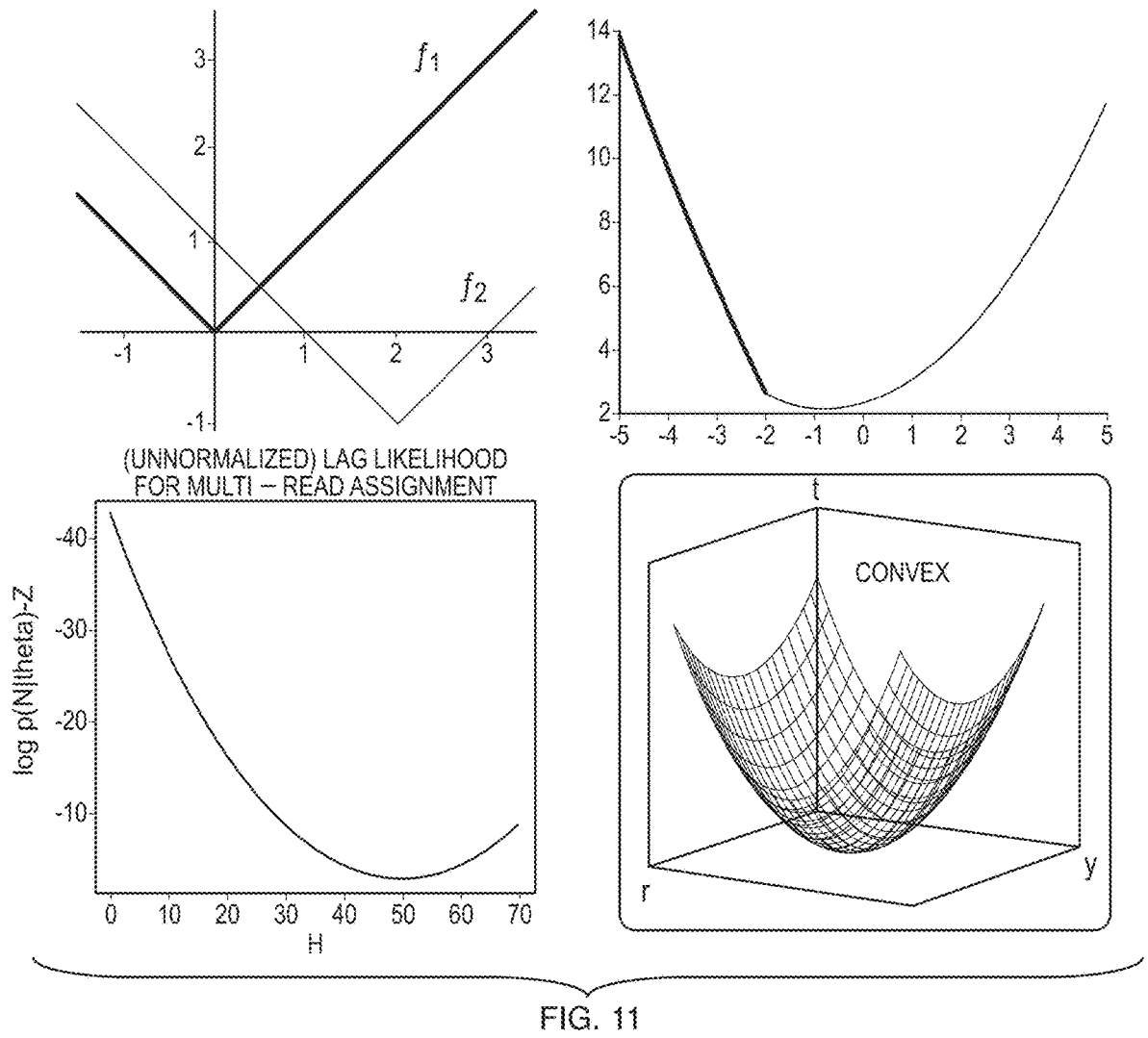
FIG. 11 shows some convex functions that can be used in various embodiments for object path determination and/or tracking.

FIG. 11 shows a variety of convex functions. Convex optimization greatly expands the types of optimization problems that can be solved efficiently. Types of criteria that can be optimized include maximum likelihood, maximum entropy, least squares, and combinations of convex criterion functions with Lagrange multipliers. Also, constraints are easily incorporated into the problem within the framework of modern convex solvers. In the tracking problem, the fundamental constraints are that that the track correspond to a model, at the deployment time and the measurements themselves.

In some embodiments, we formulate and solve the problem of tracking in invariant space as a constrained optimization problem in which one or more candidate track models and the sensor measurements are used as constraints. To see how the measurements themselves can be understood as constraints on the optimization problem, we see that the position and velocity of the target are known functions of time and the six orbital invariants, which we can denote collectively by a single symbol, as $q=(E,L,\theta,\phi,\psi,T)$.

Figure 12:
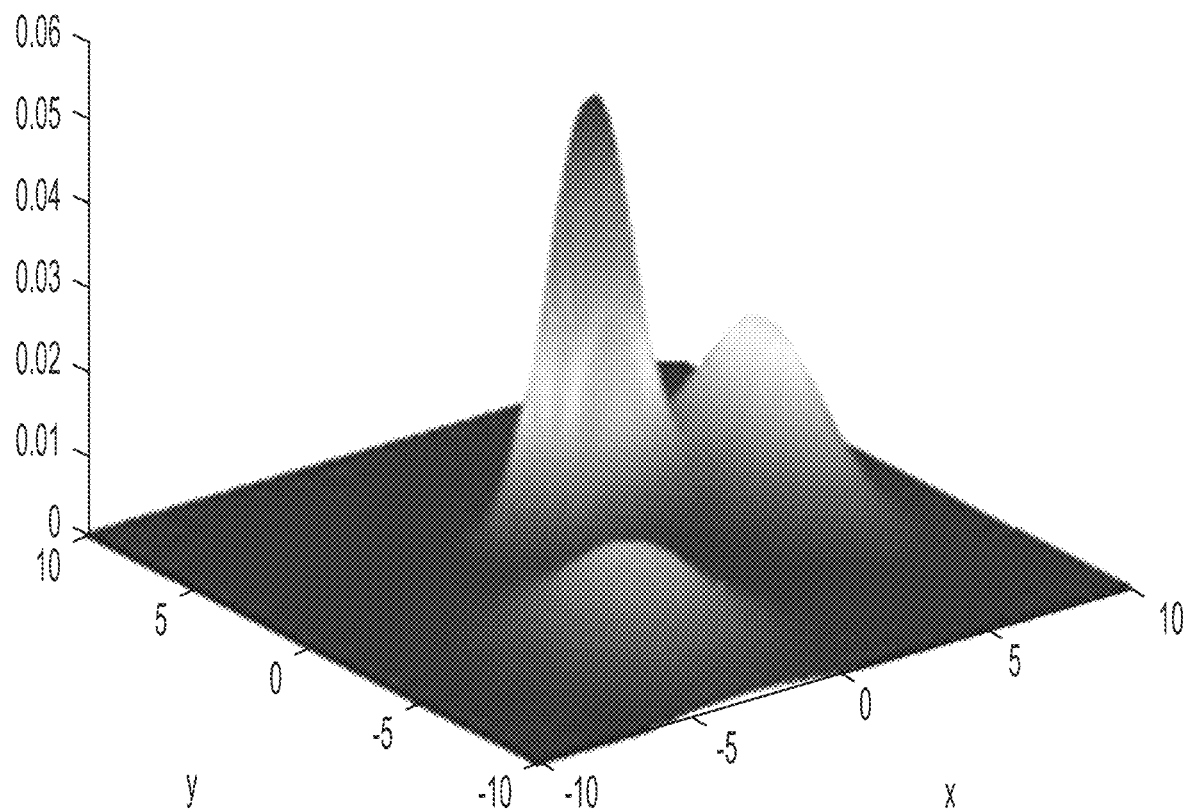
FIG. 12 shows multitarget tracks identified as a multimodal probability density in q-space, according to some embodiments.

The extension of this probabilistic idea to multitarget tracking depends on the notion that a multitarget track state is a multimodal probability distribution like the one depicted in FIG. 12.

Traditional track filters including the Kalman filter and many others rest on the fundamental assumption that the tracking problem is linear least squares optimization. This assumption is made not primarily because all tracking problems are truly linear least squares problems, but because more general methods of fast convex optimization did not exist at the time when these methods were developed in the 1960s and 1970s. A linear least squares problem has the helpful property that its solution reduces to a system of linear equations. Methods of optimization that could not be reduced to this form were simply considered intractable at the time that tracking was developed, therefore the approximations of linearity were made. Such inaccurate approximations are not needed in some embodiments described herein.

To give a brief review of the multisensor tracking problem in its general form, we first suppose that the path of a target being tracked is some parametric function of time and a set of parameters {q}, and denote it symbolically as x(t|q). This is only a statement of Newton's law, or rather that there exists a solution to Newton's law depending on time and invariants. This is true classically as long as there are no unmodeled forces. The length of time for which a model may be considered valid depends to a large degree on how precisely the forces are modeled.

Classical tracking often assumes the elementary six parameter model:

$$x(t|x_0,v)=x_0+vt \quad (15)$$

or in some cases adds a linear acceleration term. The observables are further restricted by convention to be the dot products of x or v with known constant vectors (e.g. projected ranges, projected velocities, angles of array incidence). In our more general formulation of the tracking problem, the observables can be any scalar functionals $\theta[x(t|q)]$ of the target path, and the parameters q can be any set of the invariant parameters needed to describe the path. The functional maps these parameters to a function describing the motion of the object to be blocked. For one practical example, the path of a target can be a ballistic trajectory, which can be described by the orientation in space and the semimajor and semiminor axes of an ellipse, along with a phase angle or time offset from periapsis.

The state q*, and hence the target position x(t|q*) at any earlier or later time can be found by minimizing the sum of squared differences between these functionals evaluated at observation times t and the observed values $\theta_M(t)$ at the corresponding times. $\theta_M$ is not related to $\theta$. This gives rise to a general nonlinear principle of least squares that cannot be solved by classical matrix inversion, but may be solved using convex optimization as:

$$\text{Minimize} \Psi(q) = \sum_t (\theta[x(t|q)] - \theta_M(t))^2 \quad (16)$$

More generally, in some embodiments, tracking may be described in probabilistic terms, where a probability density, formally called the 'track' is assigned over the space of generalized coordinates q. In classical tracking, this probability density is taken to have the form of a multivariate Gaussian density (whether or not that is actually the case). A very general and correct formulation of the tracking problem is given by the principle of maximum entropy. If we assume that the object of interest (the track) is a probability distribution p(q) representing our knowledge of the target state following some sequence of measurements, this track is the solution to the optimization problem:

$$\text{Maximize } H[p(q)] \text{ subject to:} E[x(t|q)]=\theta_m(t). \quad (17)$$

Here $H[p]=\int p(q) \log p(q) \, dq$ is the entropy of the probability distribution, and the symbol E (.) denotes the expected value of the argument taken over the probability density p(q).

Entropy being a convex function, the problem can again be solved using techniques of fast convex optimization, without recourse to the many ad hoc approximations that were previously needed to force the optimization into the mold of a linear least squares problem. The extension of the optimization to multiple sensors in some embodiments only requires the introduction of a second index, s, (for sensor) alongside the index, t, that runs over measurements, so that the measurements and the measurement functionals refer to multiple sensors. These techniques using fast, general convex optimization routines allow a radar to perform generalized tracking that simultaneously takes account of non-trivial kinematic parameters (e.g. the parameters of sinusoidal motions) that can be the fingerprints needed for automatic feature-aided tracking of ground targets.

Maximum Entropy Tracking

In some embodiments, sensor measurements $\theta_n$ are taken at a set of times $\tau_n$ where $n \in \{1 \ldots N\}$. These measurements are scalar functions of the position of the target, such as range, range rate, or angles as measured by a sensor, where the position and orientation of the sensor is known. The sensor can be a radar, an optical sensor like a camera, or a lidar, for example.

We suppose that the position of the target is modeled by a function of time x(t|q) involving a set of parameters q. It is assumed that this model is valid throughout the time during which the measurements are acquired. Ballistic tracking is one example of such a parametric model, since the tracks of all ballistic objects are orbits depending strictly on time and six orbital parameters, valid for a long time that is measured in hours for a target in low earth orbit (LEO), and for days or weeks for an object in medium earth orbit (MEO) or higher. The model is valid indefinitely for larger more distant objects such as planets. The orbital model is valid throughout the exoatmospheric phase of a ballistic rocket trajectory, which can last up to 30 minutes. The measurements are expressed according to the motion model as:

$$\theta(t|q)=\theta(x(t|q)) \quad (18)$$

If every possible path is assigned a probability, we obtain a probability density function p(q) over the space q of generalized coordinates. This probability density generalizes the conventional concept of target track. We will call p(q) the track. The goal of tracking is to find or estimate this function from the set of discrete measurements $\{\theta_n, n=1 \ldots N\}$ A general method of finding the probability density function satisfying numerical constraints is the Maximum Entropy Method (MEM). This method generally insures that no information is used in estimating the probability density other than the measurements themselves. It can produce an unbiased estimate consistent with the measurements. Specifically, the objective in some embodiments is to maximize:

$$H[p(q)]=\int dq p(q) \ln(p(q)) \quad (19)$$

Subject to the N constraints:

$$\int dq \theta(t_n|q) p(q) - \theta_n = 0 \quad (20)$$

Along with the normalization constraint:

$$\int dq p(q)=1 \quad (21)$$

The constraints express the idea that each measurement matches the expected value taken over all possible paths.

Equation (19) and Equation (20) are continuous equations over path space. To compute the function p (q) we need a numerical representation for this function. One representation is a Monte-Carlo representation (point cloud). To obtain this representation, in some embodiments, we specify a set of K sample points $\{q_k:k \in 1 \ldots K\}$ at random. The discrete values $p_k=p(q_k)$ represent the point-cloud representation of the probability density. This discrete formulation results in the algebraic optimization program as follows:

$$\text{Maximize} \sum_{k} p_k \ln p_k \quad (22)$$

Subject to $$\sum_{k} \theta(t_n, q_k) p_k = \theta_n \quad (23)$$

$$\sum_{k} p_k = 1$$

which has the form of the optimization of a convex function in the K unknowns $p_k$ subject to a set of linear equality constraints. Equations (22) and (23) represent a convex optimization problem in standard form that can be solved efficiently using, for example, a Second Order Cone Program (SOCP).

Another technique for representing the distribution p (q) parametrically is as a mixture of M separate Gaussian distributions (Gaussian mixture model). This model generally requires fewer parameters than the point cloud model when there are only a few targets in the scene, and their individual distributions are well-modelled by multivariate Gaussian balls. This model corresponds with the assumptions inherent in conventional multi-target tracking. Let the mean of distribution m be given by the column vector $|q_m\rangle$, let the covariance be given by $\hat{C}_m$, and let $\langle q_m|=|q_m\rangle^T$ denote the transpose of the mean (a row vector), then the Gaussian mixture model is:

$$p(q) = \sum_{m=1}^{M} A_m \exp\left[-\frac{1}{2}(\langle q|-\langle q_m|)\hat{C}_m(|q\rangle-|q_m\rangle)\right] \quad (24)$$

If the dimension of the path space is P, the number of parameters is MP for the M mean vectors, MP (P−1) for the M symmetric covariance matrices and M for the mixing coefficients A. We can denote the J=M (P²+1) model parameters by the letter α, so Equation (24) can be written formally as p (q,α). The Entropy functional given by Equation (19) is then a numerical function of these parameters. If the number of measurements is N, we can incorporate the constraints via (N+1) Lagrange multipliers as follows. Maximize:

$$\Lambda(a,\lambda) = \int dq p(q,\alpha) \ln(p(q,\alpha)) + \lambda_0(1 - \int dq p(q,\alpha)) + \lambda_n(\int dq \theta (t_n|q) p)(q,\alpha) - \theta_n) \quad (25)$$

The parameters and the multipliers can be found by maximizing this function. The numerical optimization problem is non-linear, but it admits an efficient iterative numerical solution.

Examples of Tracks

Examples in addition to orbits, where a parametric model θ(t|q) of observables is valid include: (1) Rotational motion in the absence of external torques. Assume the center of mass of a rigid target is known. The Euler angles representing the orientation of the target at any time are determined by a reference time T and the Euler angles and Euler angle rates valid at that reference time, via the solution of Euler's equations of motion. (2) Orientation of a space-stable satellite or a sun-tracking satellite with respect to a sensor in known motion relative to the satellite (e.g. a sensor at a definite position on the rotating Earth). (3) Position of a boosting rocket. Parameters are the thrust, the mass of the rocket and the mass of the fuel at a reference time, following the rocket equation.

Additional examples include: (4) An object (say a sphere, or a raindrop of definite size) falling through the atmosphere in the laminar flow regime. The drag due to air resistance is proportional to the square of velocity and the Reynolds number. The downward force is proportional to the mass. (5) Position of a guided missile subject to a control law, for example proportional guidance, when the position of the object under track can be expressed parametrically (e.g. the missile is following a target on a ballistic trajectory, based on a definite control law). (6) Cases where the observables are abstract, and not necessarily associated with the motion of any target, for example the activity of a mixture of decaying radioisotopes measured in Curies. The number of decaying nuclei of each radioactive species at a reference time, and the half-lives of the species are the parameters q of the model.

The technique we have described applies to any observable quantity that is governed by an ordinary differential equation in time, involving some set of constant coefficients. The Q initial conditions and the C coefficients of the differential equation, or any set of (Q+C) mutually independent functions of those quantities, together constitute the generalized coordinates q. It follows that the method applies to geometrical observables related to the positions and orientations of rigid objects following any deterministic force law with. The multidimensional space where every point is a set of parameters q is called path space, because each point in path space corresponds to a particular path.

The co-pending U.S. patent application Ser. No. 14/699, 871, entitled "Systems And Methods For Joint Angle-Frequency Determination," the entire disclosure of which is incorporated herein by reference, describes using compressed data for joint determination of angles and frequencies of signals received from targets emitting such signals. Unlike the techniques featured in various embodiments described herein, the methods and systems described in the co-pending patent application do not identify objects in a target field and do not determine their paths, tracks, and/or other characteristics.

Multistatic SIMO and MIMO

Figure 13:
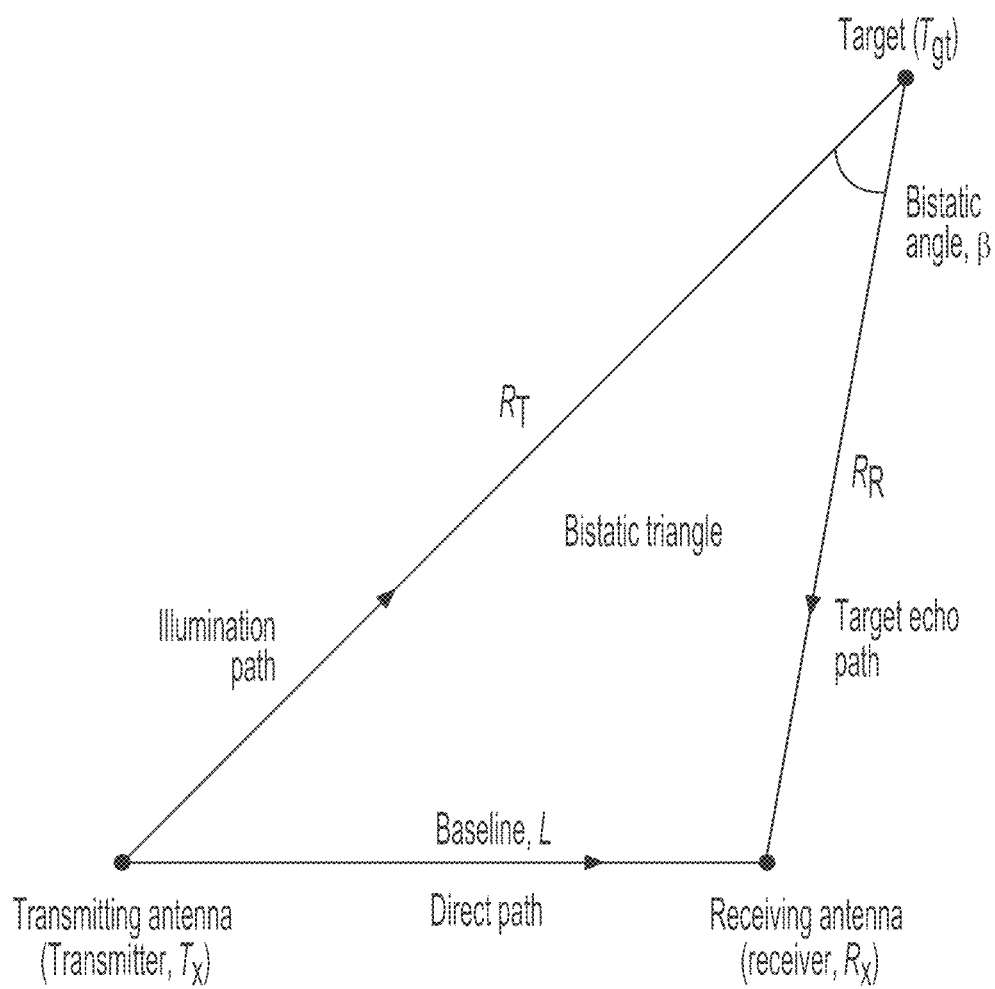
FIG. 13 depicts an example geometrical configuration of transmitter, receiver, and a target in a bistatic or multistatic radar.

FIG. 13 shows the geometry of a bistatic radar. The transmitter and the receiver are widely separated. The distances from the transmitter and the receiver to the target are comparable to the distance between the transmitter and the receiver. The direct path is used for point-to-point communications, in some embodiments.

The key complication for wideband GMTI and the distributed multistatic array, unlike a conventional narrowband GMTI radar or a SAR, is that all of the indices {f, e, t} are present. That is, the I&Q data is labeled by frequency, element and pulse time so that the entire data cube must be processed. This generally increases the bandwidth requirement for communication and the amount of signal processing required. In some embodiments, this communication burden is mitigated by GCP, which can significantly (e.g., 10%, 20%, 40%, etc.) reduce the front-end radar sensing requirements across the board. Additionally, or in the alternative, the amount of signal processing required at an element can be reduced by distributed sensing, which further reduces the amount of radar data that must be collected by a single element.

GMAP and GCP can be applied to the bistatic and/or multistatic cases. An advantage of the distributed multistatic array is the ability to measure target position and velocity in two (or even three) dimensions on a per-detection basis. To visualize this, consider the entire set of elements as a synthetic aperture teat that covers or surrounds the target in the far field, so that the distance from the target to any element of the array is large compared to the distance that the target moves during any given coherent dwell. With GCP, it is feasible to pick out one transmit element per pulse (SIMO operation). For detecting targets that move on straight lines throughout the coherent dwell, the two-way phase function takes the form:

$$\phi(f, e, t \mid x, y, v_x, v_y) = \qquad (26)$$
$$\frac{2\pi f}{c}(|T(e, t) - s(t|x, y, v_x, v_y)| + |R(e, t) - s(t|x, y, v_x, v_y)|)$$
where
$$s = (x + v_x)\hat{x} + (y + v_y)\hat{y} \qquad (27)$$

Here f is the wideband frequency, e is the index corresponding to one of the receivers, t is the pulse time, q={x, y, $v_x$, $v_y$} are the position and velocity coordinates of the target in the ground plane and T (e, t) and R (e, t) are the positions of the designated transmitter and receiver at the given pulse time. By substituting this expression into Equation 4, a four dimensional image σ(x, y, $v_x$, $v_y$) of the positions and velocities of targets on the ground can be calculated.

Equations (4) and (13) provide a method for efficiently converging on detections in the four-dimensional space of target position and velocity without ever actually computing the image, which has the potential to greatly reduce the burden on the signal processor. This multiresolution evaluation technique, in addition to sparsity-based processing, is an essential element of SAKÉ, by allowing the processor to extract the actionable content from the compressed data stream without computing the entire image as described below.

Depending only on the region of integration and the form of the phase function, the matrices corresponding to any region of the detection space can be precomputed. This suggests the possibility of a general multiresolution technique for converging on the peaks in logarithmic time without ever computing the image. The space may be initially divided into quadrants, the largest energy quadrant may be selected and this process can be iterated by further subdivision to converge on a detection. The computation required at each stage of the iteration may only be an outer product of the form ⟨z|Q(R)|z⟩, a computational advantage that was discussed previously.

In these computations, the one or more transmitters and the one or more receivers need the knowledge if each other's relative positions, denoted as $T_1$, $T_2$, . . . etc., and $R_1$, $R_2$, $R_3$, . . . etc. These positions may be known or can be determined and exchanged by the transmitter and receiver elements.

Dual-Use Waveforms

In order to facilitate efficient communication between transmitter and/or receiver antenna or sensor elements, some embodiments employ waveforms that can serve the dual roles in wideband radar sensing and point-to-point wideband communications. A suitable radar waveform generally has the property of being resilient to interference, noise, and distortion due to multipath effects. For communications, data rate and bit error rates place restriction on the waveforms.

Figure 14:
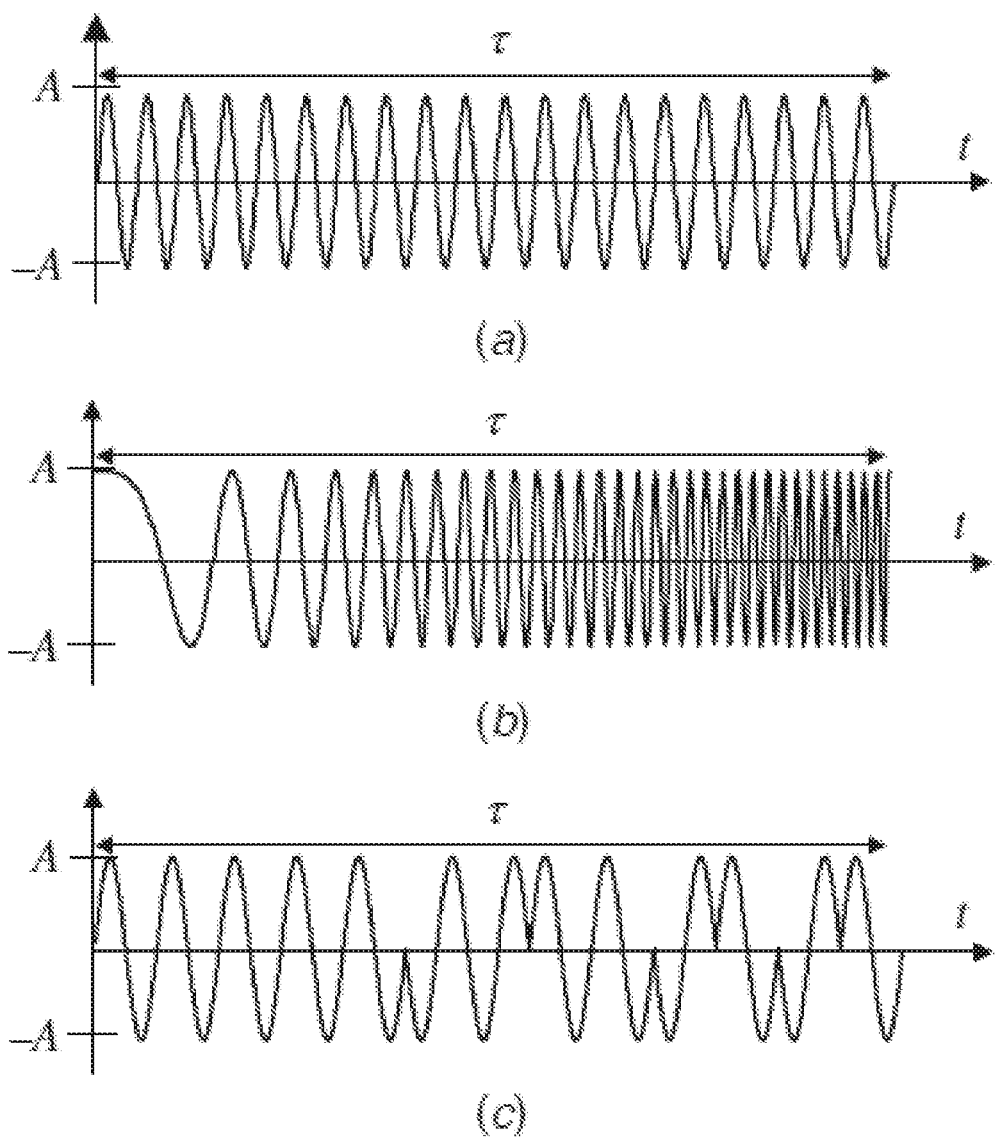
FIGS. 14A-C show different waveform types that can be used as dual-use waveforms according to some embodiments.

Some embodiments of a distributed radar may use wideband phase-coded waveforms jointly for radar illumination, array element localization, and communication. FIGS. 14A-C show (a) a sinusoidal waveform as in pulse-Doppler radar, (b) a linear frequency-modulated (LFM) waveform that is often used for wideband radar sensing and (c) a biphase pulse-coded waveform. In the biphase-coded waveform, sequential sinusoids are either left unshifted or phase-shifted by 90° at each zero-crossing. This procedure can produce a wideband waveform suitable for radar, but can also carry information in the form of the sequence of phase shifts, which can be used to transmit a binary sequence.

A popular class of biphase codes, called Barker codes, has an ideal flat sidelobe structure and theoretically minimum peak sidelobe level when self-correlated. The longest sequence with this ideal sidelobe property (13 bits in length) is {+++++−++−+−+} with a peak sidelobe level of −22.3 dB. But this sequence, being fixed, is not useful for transmitting information.

Figure 15:
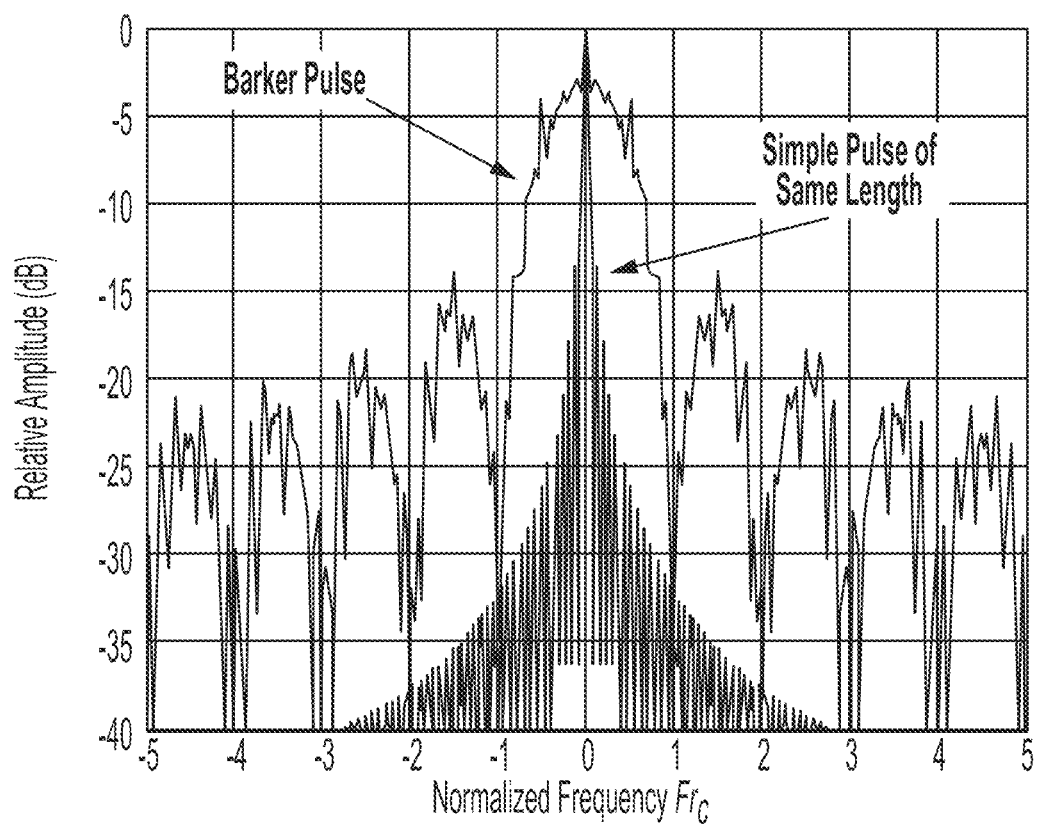
FIG. 15 shows the spectrum of a signal having a 13-bit Barker sequence.

It is not immediately evident that a biphase-coded waveform has non-zero bandwidth, as will be needed for radar. Bandwidth is induced by the sharp discontinuities where the sinusoidal waveform switches phase. FIG. 15 shows the spectrum of the 13-bit Barker code. This spectrum illustrates that biphase coding generates bandwidth and so is capable in principle of carrying information and at the same time performing wideband radar sensing functions.

Figure 16:
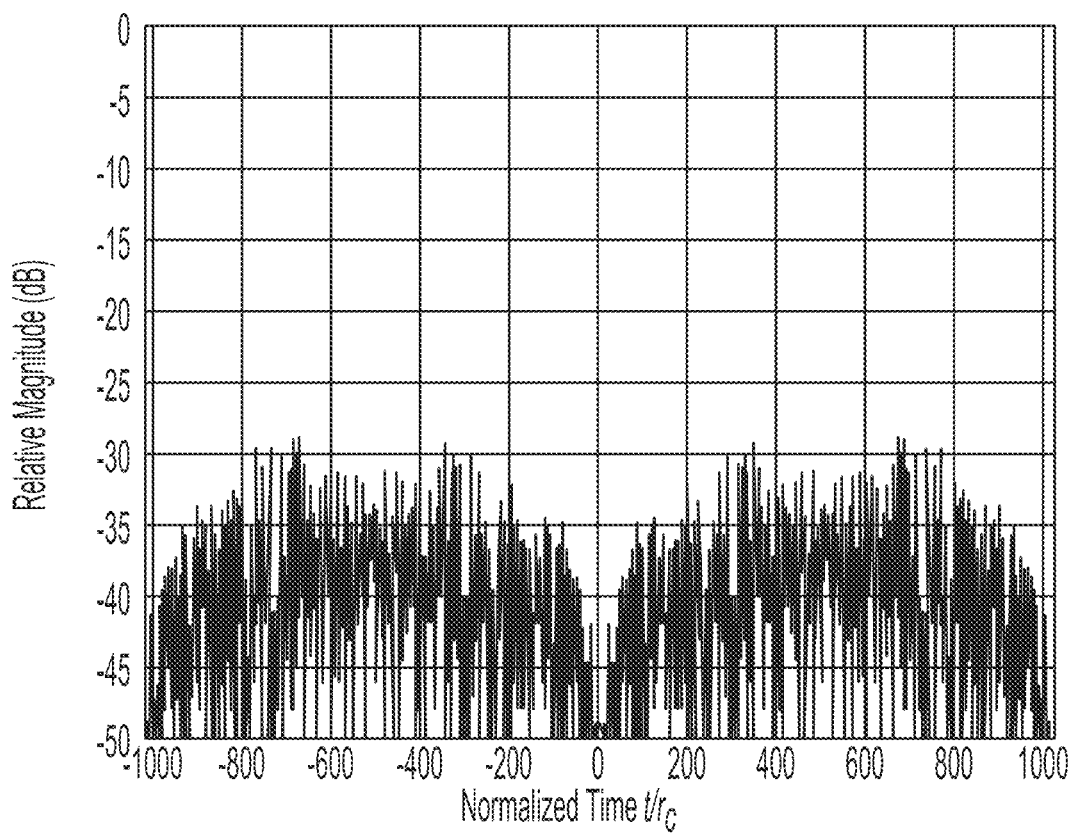
FIG. 16 depicts the main response and sidelobes of a 1023-point biphase code with a pseudorandom sequence of phase shifts, according to some embodiments.

Another waveform that is more suitable for carrying information than a fixed code, and at the same time can provide signal bandwidth needed for radar sensing, is a long biphase code with a pseudo-random sequence of 90° phase shifts. FIG. 16 shows the mainlobe and sidelobe structure of a 1023-point biphase coded waveform generated in this way.

Long pseudorandom biphase sequences like this are suitable for both the communication and radar sensing functions of a distributed radar system. Instead of the sequence being drawn at random, it represents the bits of a binary encoded message that is to be communicated from point-to-point. This message may contain a time-stamp phase element localization, or it may contain measured I&Q data from the previous pulse that must be shared among the processors in order to perform the coherent radar signal processing function in a distributed manner.

Figure 17:
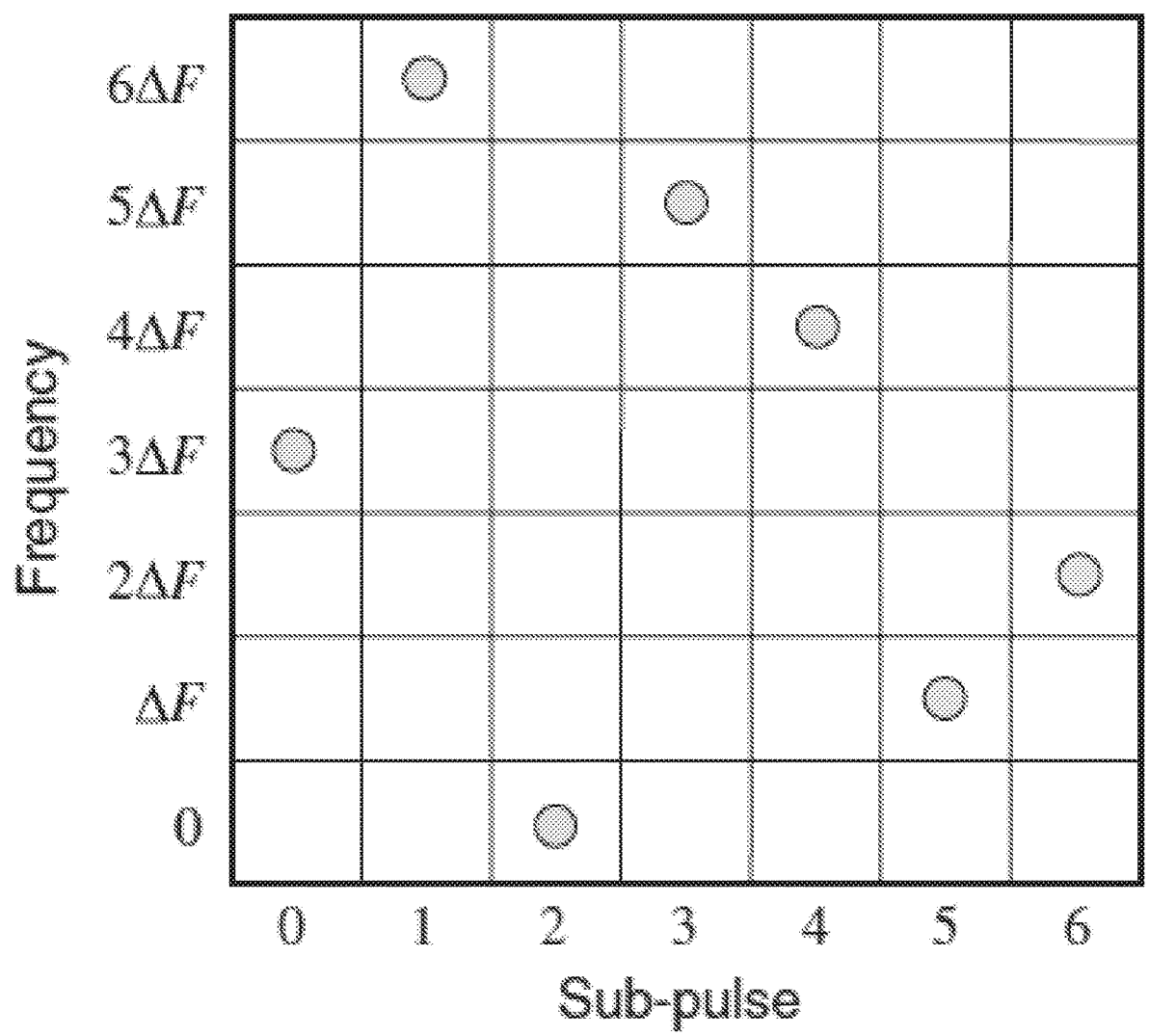
FIG. 17 depicts a Costas waveform with segments of LFM chirp in permuted time-order; according to some embodiments.

A third type of waveform that can be used to provide wideband illumination for radar sensing and simultaneously used to communicate information is a Costas waveform. A waveform of this type is spectrally identical to a linear FM chirp waveform, except that the waveform is divided into a sequence of time blocks. The portions of the linear FM chirp corresponding to each of these temporal blocks may then be transmitted in an out-of-sequence permutation order. The concept of a Costas waveform is illustrated in FIG. 17. Besides having highly desirable correlation properties, these waveforms can be used to encode information. A single chirp divided into N temporal blocks can be transmitted in N! ways, incorporating in this way an alphabet of symbols for purposes of communication.

Costas waveforms have the property that they can be used in continuous wave form by using alternating consecutive up-chirp and down-chirp sequences. In some embodiments, a continuous Costas-type sequence is used in which there is no attempt to transmit one full chirp at a time in sequence, but rather to visit all of the possible up-and-down chirps are visited in an ongoing pseudorandom sequence. Such a waveform has sufficient bandwidth for radar sensing and is also capable, like the pseudo-random phase code, of communicating information continuously.

The coding being in the frequency domain, the Costas waveform can be used in the manner of frequency multiplexing rather than time. Therefore multiple receivers (and optionally transmitters) can work on a simultaneous noninterfering basis by operating in distinct frequency bands. This scheme has some advantages, including the possibility of pulse-free continuous illumination and communication, and true multiple-input, multiple-output (MIMO) operation where the different elements of the array can both broadcast and receive from all of the other elements simultaneously.

Attritable Radar Targeting using Integrated Swarm Technology (ARTIST)

In some embodiments, the determination of paths of one or more objects, computation of target attributes, and/or tracking can be performed using a sensing technology, Attritable Radar Targeting using Integrated Swarm Technology (ARTIST). Various embodiments of ARTIST are based on swarms of small UAVs equipped with attritable radars. These embodiments facilitate sensor integration and may employ compressive sensing and may use shared resources to help keep the individual radar sensor and processor elements in the swarm power-efficient, small, light, low-cost and attritable.

Various ARTIST embodiments feature one or more of: (1) An autonomous collaborative UAV swarm that performs compressive, adaptive radar sensing; (2) Distributed signal processing via wideband point-to-point microwave communication links carrying information near the sensor data level; (3) Dual-use coded waveforms for point-to-point communication and target illumination; (4) Distributed multistatic arrays facilitated by novel signal processing; and (5) Element geolocation and phase lock using atomic clocks.

Some embodiments facilitate a fully coherent swarm-based radar system for prosecuting ground-targets. The capabilities of these embodiments are applicable to diverse areas of radar including SAR, GMTI, dismount detection, and many others. Building on the framework of generalized coordinates provided by GMAP, we develop an approach to compressive radar signal processing called Generalized Compressive Processing (GCP) that allows us to perform radar measurements at the Rate of Information (ROI) instead of the much higher classical Nyquist sampling rate. Like GMAP, GCP encompasses many coherent sensing problems where the phase of the measured data can be modeled as a function of the measurement dimensions and some set of physics-based generalized coordinates.

If all of the actionable knowledge is already present in the data measured at the ROI, then it should be possible to convert this data into actionable knowledge without ever reconstructing the image. The embodiments that performs this process is called Sparse Actionable Knowledge Extraction (SAKE), and are described below. Completing the theme of power efficiency via sharing of resources among elements in the swarm, Some embodiments of ARTIST can distribute the processing load among processors located on individual platforms, to save more power. GCP calls for Distributed Convex Optimization (DCO) convex optimization. Our Distributed Convex Signal Processing (DCSP) technology based on DCO makes it possible to perform these computations with high utilization across distributed computing elements connected with high bandwidth microwave broadcast data links.

In some embodiments, the distributed radar so-constructed is software-defined and reconfigurable in a strong sense: the transmit/receive elements on separate platforms can rearrange themselves in space and time to form an agile, spatially reconfigurable synthetic aperture. The configuration of this aperture is restricted only by the flight envelopes of the vehicles in the swarm. The distributed processor may be equipped with advanced multistatic algorithms that perform the reduction of radar data to specified actionable information in a seamless and unified fashion.

Typically, size, weight, power and cost are important considerations in the design of an active sensor network with attritable elements. These drivers led to the unique features of the different embodiments of ARTIST system. Distributed computation carried out using processors on separate moving platforms can save weight and power. Distributed, compressive sensing strategies can reduce communication rates and save power in both sensing and communications. Dual use sensing and communication systems may reduce power requirements even further, while also contributing to covert operation. Resilient computational algorithms enable continued operation when one or more platforms is lost.

Attritable Swarm Radar

Figure 18:
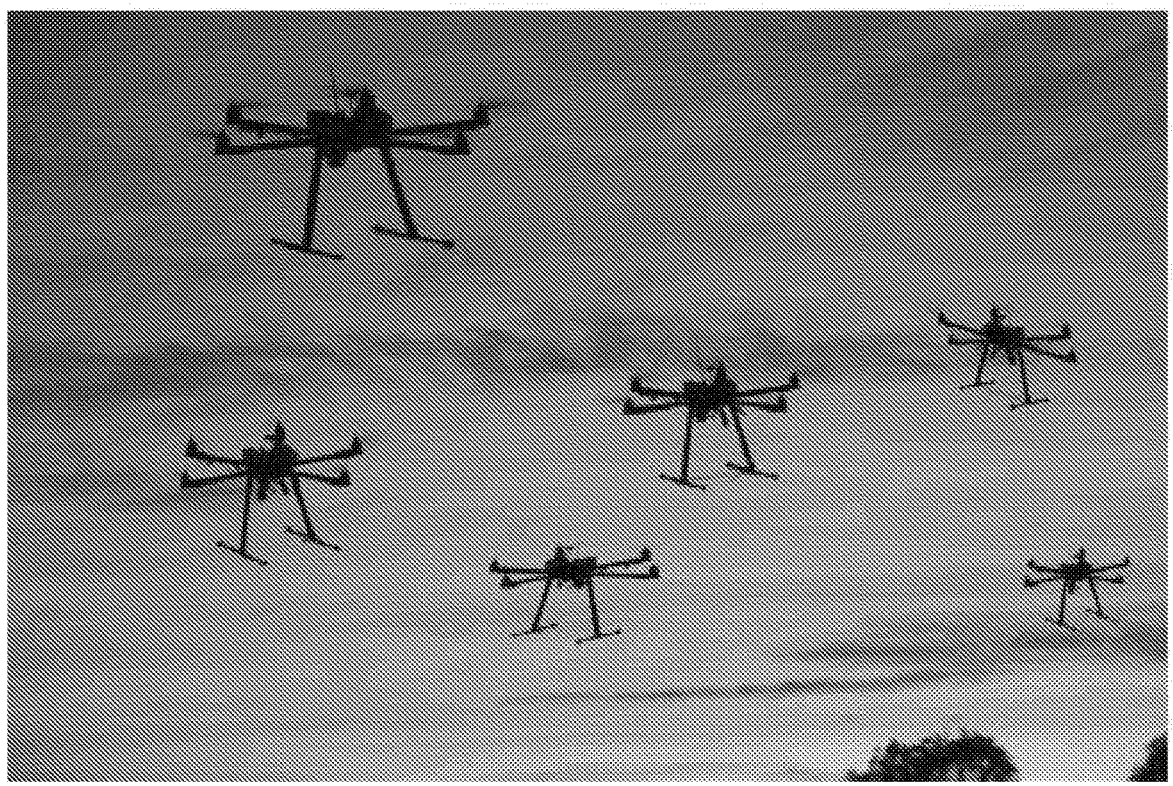
FIG. 18 schematically depicts a swarm of unmanned aerial vehicles (UAVs), according to some embodiments.

FIG. 18 illustrates a concept of operations for ARTIST. In this concept, small, power-efficient and inexpensive radar transceivers hosted on individual aerial platforms replace high value assets and human operators. Advanced signal processing and geometrical diversity allow the sensors to jointly extract kinematic signatures of the moving targets on the ground at the detection level. Because this auxiliary information is available to the tracking function, long term automatic feature-aided tracking of ground targets is greatly facilitated.

UAVs are interconnected by high bandwidth microwave communication channels capable of sharing raw radar data from one UAV to another. Dual use waveforms described above may be used in some embodiments. By distributing the computations among the different platforms in this way, the weight and power that must be hosted on each platform is reduced. The challenge of moving radar sensing from large manned platforms to swarms of much smaller attritable UAVs is to reduce size, weight, power and cost on the individual UAVs. ARTIST achieves this goal through a combination of technologies working in a complementary way. In some embodiments, a swarm of UAVs can form the elements of a steerable surrounding synthetic aperture. Data processing may be carried out in a distributed fashion with high bandwidth point to point microwave data links playing the role of a data bus. Dual-use coded waveforms may be employed for communication and illumination.

In various embodiments, ARTIST achieves the revolutionary savings in size, weight, power and cost that are needed to host radar sensing on small unmanned aerial platforms by a combining an unprecedented level of sensor integration with smart compressive sensing. Compressive sensing using our GCP technique can reduce the radar measurement load by an order of magnitude, to the rate of information in the scene. This measurement load may be shared between sensors acting as a single coherent aperture to further reduce sensing power requirements by up to another order of magnitude.

Measuring less in the first place can reduce sensing power requirements by orders of magnitude, while less measured data enables data-level fusion of information among swarm elements, enabling some ARTIST embodiments to perform existing radar functions better than monolithic radars, and to perform entirely new functions based on GMAP signal processing. On the processing side, signal processing in various SAKE embodiments can reduce measurements taken at the rate of information to actionable knowledge, without the intermediate step of decompressing the data internally into an image, greatly reducing processor power and memory requirements. And because information is shared among platforms at the data level, the processing load can be shared among platforms to further reduce processing power requirements.

Different embodiments can save power by doing one or more of: (1) Save power by measuring compressively, measuring less to begin with; (2) Save power per UAV by sharing the measurement load; (3) Save processing power through SAKE signal processing that reduces data at the rate of information to the actionable knowledge, without the costly intermediate step of reconstructing images from data; (4) Save power by sharing the processing load; and (5) Perform traditional radar functions better, and enable functionalities such as path determination, attribute extraction, and tracking by using the entire integrated swarm as a single radar using GMAP. The integration of one or more of these strategies means embodiments of ARTIST may use less power, weigh less, fit in a smaller package, and may achieve the goals of radar sensing on attritable unmanned platforms.

Sparse Actionable Knowledge Extraction (SAKÉ)

Compressive sensing has shown that it is possible to reconstruct an image using sensor measurements taken at much lower than the conventional Nyquist rate. Embodiments of ARTIST takes this observation to the next logical step. Compressive, distributed sensing allows ARTIST to save power, cost and data throughput at each of the individual sensors in the swarm, to help achieve the goals of attritable radar sensing.

Figure 19:
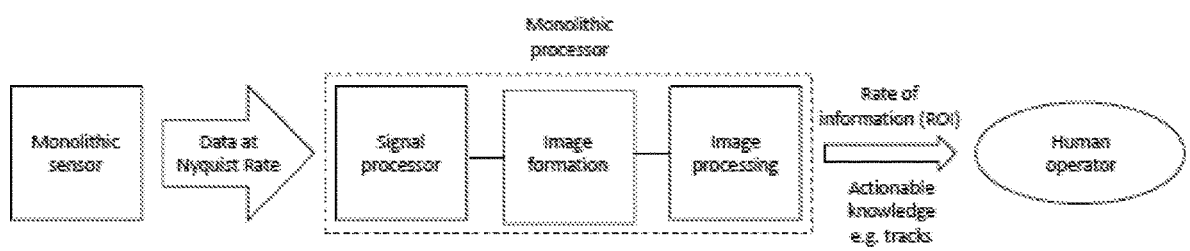
FIG. 19 schematically illustrates a conventional approach to airborne ISR signal processing.

FIG. 19 shows the flow of information in a conventional airborne sensor and signal processor. The sensor onboard an airborne platform like a UAV typically gathers information at the Nyquist rate required for perfect Fourier reconstruction of a band-limited signal or image. This rate is much higher than the rate of information (ROI) that is ultimately extracted via digital signal processing and passed on to an operator. We call this ultimate data product Actionable Knowledge. In a typical case, actionable knowledge might be a set of target tracks with associated classifications. The purpose of the signal processor is to transform measured data at the Nyquist rate to Actionable Knowledge at the ROI. The conventional system generally requires reduction of the information measured at the Nyquist rate to actionable information at the rate of information on board a single platform.

The processor first performs a transformation of the measured data into an image. This is viewed as a lossless process; the measurement domain and the image domain form a transform pair, this transform being invertible. This stage of the computation is often performed in a special-purpose DSP. The transform to image space is followed by a lossy image interpretation stage that compresses images at the Nyquist rate to actionable knowledge (e.g. tracks) at the ROI.

Figure 20:
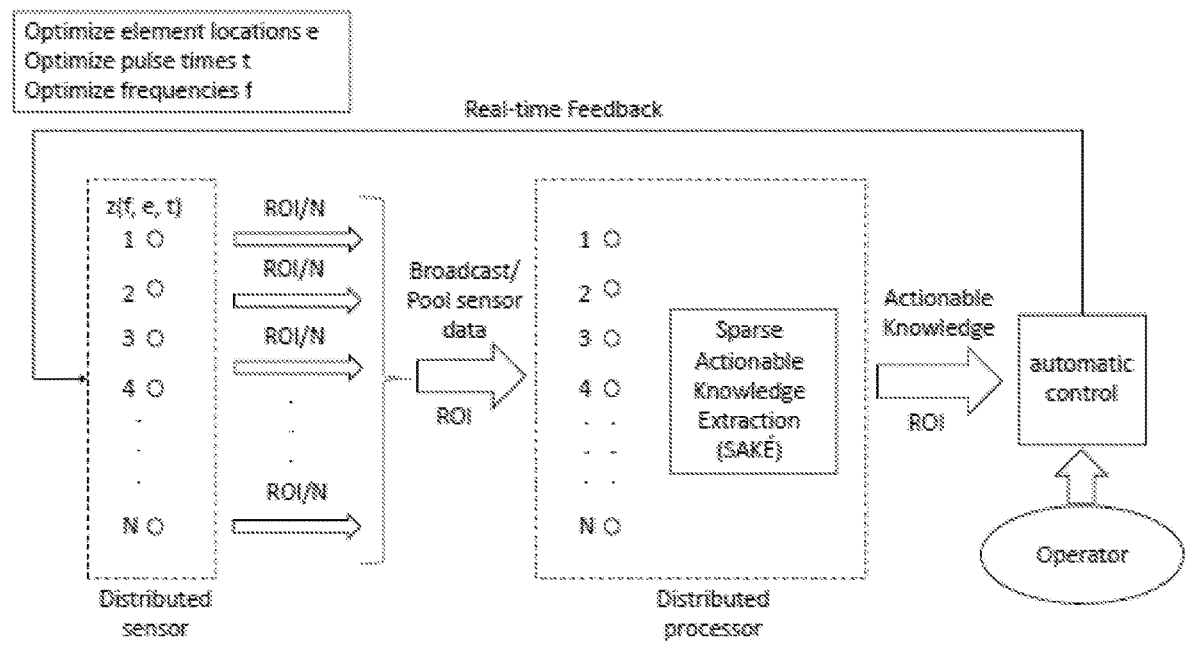
FIG. 20 schematically depicts the SAKÉ system, according to some embodiments.

FIG. 20 shows an embodiment the (SAKÉ) data flow process for ARTIST. Individual UAVs in the swarm perform measurements at the ROI divided by the number of sensor elements. These measurements are broadcast and folded together in the individual processors in the swarm to form a stream of information at the ROI. In this broad sense, sensor signal processing can be viewed as a type of data compression. In various embodiments, a SAKÉ system can drastically reduce (e.g., by 10%, 15%, 20%, 40%, 50%, 60%, or by more) sensor measurements, processing and throughput for individual drones in the ARTIST swarm.

The mathematics of compressive sensing witnessed rapid development during the last decade. It has found a number of applications, notably in the fields of video imaging and medical radiology. Compressive sensing exploits the idea that it is possible under very general conditions to exactly reconstruct the solution to an underdetermined system of linear equations if we can be sure that the solution is sparse (contains many zeros or near zeros) in the target domain. Such a reconstruction can be accomplished, however, if the problem is cast as an optimization problem subject to equations of sensor measurement, expressed as linear equality constraints.

FIG. 20 illustrates many of the aspects of ARTIST. First, the individual sensor elements form a coherent distributed array. This can save power and cost by reducing the antenna needed on each individual UAV, and may provide the geometrical diversity needed to perform advanced signal processing including generalized STAP clutter suppression for moving target detection.

Compressive sensing allows the elements of the swarm to jointly measure at a rate much lower than the Nyquist rate. The first advantage is provided by compressive sensing. The second advantage is provided by distributed sensing. Various embodiments of SAKÉ compressive processing can bypass the formation of radar images and can extract actionable knowledge at the ROI from compressed measurements at the ROI directly. Distributed processing can share the processing load among all of the elements of the swarm, reducing the power and cost of the processor needed on the individual UAV platforms. Knowledge may be fed back in real time to automatically adjust all aspects of the measurement process, optimizing the quality of the information extracted. Aspects of the distributed sensor array to be optimized include spatial array configuration, temporal pulse patterns and transmit spectra of each active array element.

Communication Cost Optimization

Figure 21:
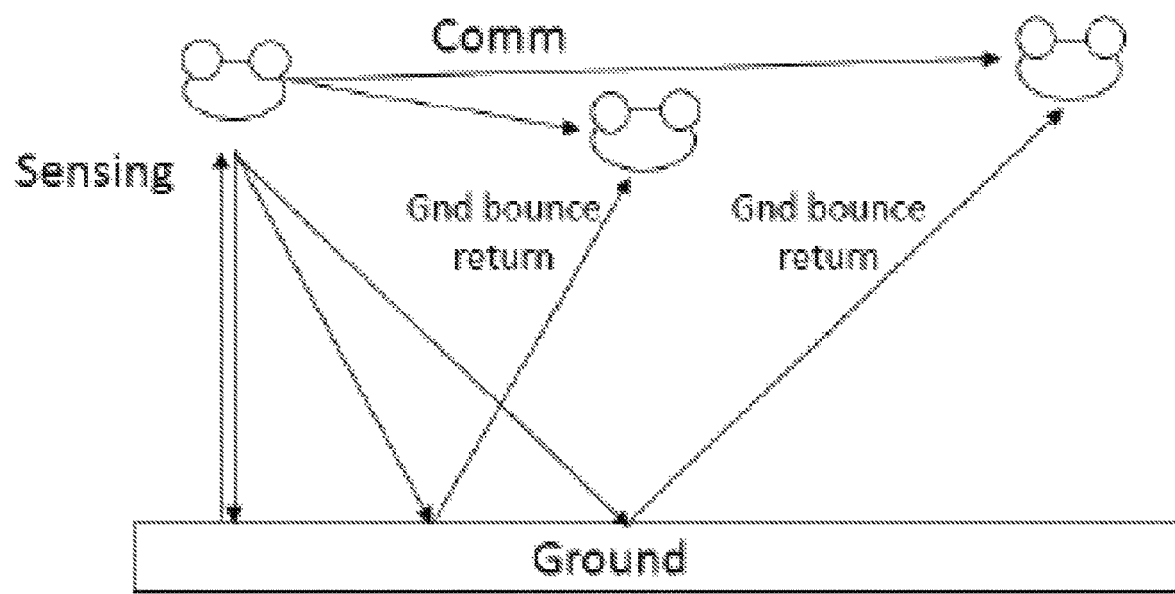
FIG. 21 illustrates a UAV swarm performing dual band sensing and communication, according to some embodiments.

Inter-UAV communication is potentially a major source of energy consumption. Some embodiments address this problem by broadcasting sparse data among UAVs for free by using the dual-use waveforms. In this scheme, pulses used to measure data at given time also carry data sampled in the previous iteration as well as intermediate results of on-going parallel computation. FIG. 21 shows the pictorial representation of the process. A single UAV is shown to transmit a dual-use waveform signal. The signal measured by the transmitting UAV is used for ground sensing while the signal traveling in the direction of the adjacent UAVs is used to communicate the data sensed by the transmitting UAV in the previous pulse burst. In case the data bandwidth of the dual waveform is not sufficient, a higher-bandwidth link may be used to perform air-to-air communications. Minimizing the communication frequency interactions amongst the UAVs can help save power. Parallel data sharing processes that avoids redundant exchange of information can also benefit ARTIST. The distributed UAV swarm can thus perform dual band sensing and communication.

Ground Moving Target Tracking

Embodiments of ARTIST can perform Ground Moving Target Tracking (GMTT), a critical radar function. The challenge in GMTT is to piece together the continuous track of a moving ground vehicle, and follow it through a long sequence of activities that may include commonplace traffic maneuvers (e.g. periodic stops and turns in the vicinity of nearby vehicles and ground clutter) or may be expressly evasive in character, as when the driver of the target vehicle is aware that he may be under surveillance. Embodiments of GMAP signal processing techniques provide the ability to detect a ground vehicle in two dimensions of position and two dimensions of velocity.

Figure 22:
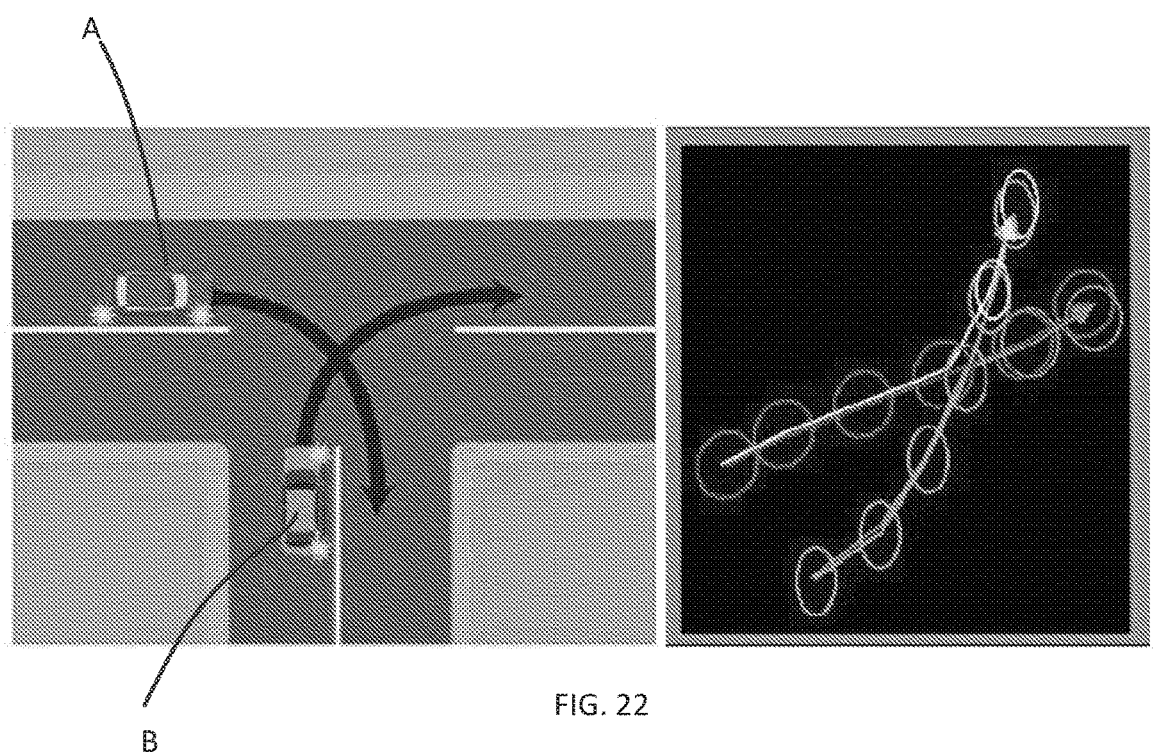
FIG. 22 illustrates path determination and tracking using classification features of a target object, according to some embodiments.

ARTIST GMAP signal processing can tag detections with target attributes extracted as described above to provides the key to overcoming classical challenges in GMTT. FIG. 22 illustrates one of the fundamental challenges encountered in classical target tracking, called crossing tracks. Two tracks cross in the scene, but the conventional radar view (illustrated via a sequence of track covariances on the right) is 'color blind' without additional discriminating features per target detection. This creates significant confusion when trying to track and maintain the identity of a ground vehicle over a long period of time. The scene on the left shows two vehicles meeting at an intersection. If we assume that Vehicle A is under surveillance, the probability of switching track with Vehicle B is high. Without actual detections during the precise moment of crossing, and being blind to the colors (i.e. lacking strongly discriminating target features) the radar 'sees' a single vehicle moving from left to right, whereas the two vehicles have switched places. The track of Vehicle A is lost. GMAP signal processing can tag detections with attributes that uniquely fingerprint the targets in the scene, in effect restoring color to the scene to allow the targets to be correctly tracked through the maneuver. Thus, ARTIST GMAP-based classification of features in some embodiments, such as determination of characteristics of vibrations of a stopped vehicle, can help provide continuous tracking through target crossing events.

The ability of various embodiments described herein to provide simultaneous stationary and moving target features helps mitigate other challenges that arise when using conventional GMTT radar. One or both vehicles may most often stop completely at the intersection. A stationary vehicle cannot be distinguished from ground clutter using conventional processing, and thus may become invisible to the radar once it has come to a stop. It only reappears to the conventional radar when it regains sufficient velocity to be re-acquired. The metric called Minimum Detectable Velocity (MDV) expresses this idea. Even a radar system with an exceptional MDV of a few miles per hour will have (at best) even odds of maintaining continuous track on the vehicle under surveillance. GMAP simultaneous SAR and GMTI sensing can address these challenges.

As discussed herein, mapping candidate locations, paths, and/or tracks from a physical space to a parameterizable path space, and optimizing a function of expected sensor phases or track probabilities subject to constraints based on observed sensor signals cannot be considered to be a mathematical or mental concept. These operations that takes into consideration the observed sensor data and models of paths and/or tracks of physical motion, as described above, is also not merely performing generic computer and/or database operations and is also not mere data organization or reorganization.

Unlike any generic operations such as data transmission and reception, unlike usual computer functions such as storage and access of information, and unlike any mathematical or mental processes such as comparing and categorizing information, the unconventional operations involved in mapping and optimizations, as described herein, are specifically orchestrated. Specifically, the mapping enables exploration of several candidate physical paths (including object features) or tracks and the optimization can take advantage of the sparsity of these paths and tracks to find the actual likely paths, tracks, and other features such as mechanical vibrations among several candidates in an efficient manner. These specific operations make the methods and systems for mapping and optimization limited and specialized techniques of minimizing the cost of sensors and data processing systems, while achieving the desired performance.

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted. Sets and subsets, in general, include one or more members.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communication protocols to facilitate communication between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/processing elements.

The device(s) or computer systems that integrate with the processor(s)/processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communication with other processors, where such one or more processor can be configured to operate on one or more processor/processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communication protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

What is claimed is:

1. A method for analyzing motions of objects, the method comprising performing by a processor the steps of:
   generating a set of constraints comprising: (i) a set of observations at a receiving antenna, and (ii) a plurality of sets of phase shifts at the receiving antenna, each set of phase shifts comprising phase shifts observable at the receiving antenna corresponding to a point scatterer associated with a respective path point in a set of path points, each path point representing in a path space a respective expected path of motion of a point scatterer in a physical space;
   determining intensity of each path point in the set of path points: (i) by exploring a set of fields, each field corresponding to a respective path point in the set of path points, (ii) while satisfying the set of constraints; and
   identifying a first path, in the physical space, of a first point scatterer, based on the respective intensities of the path points.

2. The method of claim 1, wherein:
   a number K of the path points in the set of path points is greater than a number N of the observations at the receiving antenna in the set of observations.

3. The method of claim 2, wherein exploring the set of fields comprises selecting the set of path points such that a number of near-zero fields in the set of fields is maximized.

4. The method of claim 3, wherein exploring the set of fields comprises second order cone programming (SOCP).

5. The method of claim 1, wherein:
   the path space comprises a parametric space; and
   at least one parameter of the parametric space is selected from the group consisting of: a position, a linear velocity, and an angular velocity.

6. The method of claim 1, wherein the representation of a path point in the path space comprises one of:
   a three dimensional position vector;
   a six dimensional vector comprising a three dimensional position vector and a three dimensional velocity vector; and
   a vector comprising a six dimensional vector representing rigid body motion and a position vector.

7. The method of claim 1, wherein:
   the receiving antenna comprises $N_E$ elements, each element being associated with up to $N_F$ frequencies and up to $N_T$ pulses; and
   each phase shift observable at the receiving antenna is associated with an antenna element, one of the $N_F$ frequencies, and one pulse.

8. The method of claim 7, wherein a number N of the observations at the receiving antenna in the set of observations is less than $N_E * N_E * N_T$.

9. The method of claim 7, wherein each expected path of motion of the point scatterer in the physical space corresponds to a single dwell of the antenna, the single dwell corresponding to $N_E$ elements, $N_F$ frequencies, and $N_T$ pulses.

10. The method of claim 1, further comprising:
    identifying a second path, in the physical space, of a second point scatterer, based on the respective intensities of the path points.

11. The method of claim 10, further comprising:
    determining via a comparison of the second path with the first path that both the first and second point scatterers are associated with a rigid body; and
    determining a path of the rigid body according to at least one of the first and second paths.

12. A processor-implemented method for analyzing motions of objects, the method comprising
    performing by a processor the steps of:
    receiving a track model representing a plurality of candidate tracks of motion of an object in a physical space, the track model comprising a time variable and a parameter set, each unique value of the parameter set representing a distinct candidate track in the physical space, the track model being valid for a plurality of data collection intervals;

receiving observed data from a sensor, the observed data being collected from a start time up to an end time;

selecting a plurality of candidate tracks, each candidate track being represented by the track model and corresponding to a respective selected value of the parameter set;

generating, using a functional, a plurality of sets of expected sensor data from the track model, each set corresponding to both a respective one of the selected candidate tracks and a respective value of the parameter set;

identifying a candidate track as an expected track by optimizing a relation of the plurality of sets of expected sensor data and the observed data; and determining the candidate track as a physical path of the object in the physical space.

13. The method of claim 12, wherein the track model comprises a Kepler gravity model.

14. The method of claim 12, wherein:
the track model comprises a ballistic track model; and
the parameter set of the track model comprises:
 a parameter representing total energy of the object;
 a parameter representing orbital angular momentum magnitude of the object;
 a subset of parameters representing orientation of an orbit of the object in space; and
 a parameter representing time of periapsis of the object.

15. The method of claim 12, wherein the sensor is selected from the group consisting of a radar, a lidar, and a camera.

16. The method of claim 12, wherein the sensor comprises: a multi-element radar; and
the data collection interval comprises a dwell time of the radar.

17. The method of claim 12, wherein optimizing the relation comprises: assigning a probability to each candidate track represented by a respective parameter value such that:
 across all selected parameter values a summation of a function of the candidate track probabilities and respective sets of expected sensor data is equal to the observed data within a specified threshold; and
 entropy of the assigned probabilities is maximized.

18. The method of claim 12, wherein the optimizing step comprises:
 selecting a parameter value such that a function of the set of expected sensor data corresponding to that parameter value and the observed data is minimized across all selected parameter values.

19. The method of claim 12, wherein:
the start time corresponds to a time at which the motion of the object started; and
the end time corresponds to a time at which a track of the object is to be determined.

20. The method of claim 19, wherein a time difference between the end time and the start time comprises an integer multiple of a data collection interval.

21. A method for analyzing characteristics of objects, the method comprising, performing at a first station in a plurality of stations, the steps of:
collecting observations using a sensor;
via a communication module, at least one of: (i) receiving observations collected by a second station in the plurality of stations, and (ii) exchanging data with a third station in the plurality of stations; and solving jointly by a processor and with the third station, an optimization task having constraints that are based on at least one of: (i) observations collected by the sensor, and (ii) the received observations, to determine a characteristic of an object, the solving jointly comprising distributed processing to identify a first path, in a physical space, of a first point scatterer, based on respective intensities of path points in a set of point paths, the constraints comprising a set of observations and a plurality of sets of phase shifts corresponding to a point scatterer associated with a respective path point in the set of path points, each path point representing in a path space a respective expected path of motion of a point scatterer in the physical space.

22. The method of claim 21, wherein the sensor comprises at least one of: (i) at least one receiving element of a radar antenna, (ii) at least one receiving element of a lidar antenna, and (iii) a camera.

23. The method of claim 21, wherein:
the sensor of the first station comprises a first receiving element of a multi-element radar antenna,
the second station comprising a second receiving element of the multi-element radar antenna; and
the multi-element radar antenna having $N_E$ receiving elements, and a dwell period corresponding to $N_T$ pulses, each pulse comprising $N_F$ frequencies.

24. The method of claim 23, wherein:
the multi-element antenna is configured to collect less than $N_E*N_F*N_T$ observations in a single dwell period.

25. The method of claim 24, wherein:
the multi-element antenna comprises N receiving elements, N being at least equal to two; and
collecting observation using the sensor comprises collecting observations at a rate not exceeding a fraction of a rate of information associated with the characteristic of the object.

26. The method of claim 23, further comprising transmitting a radar signal using at least one of: the sensor of the first station and the sensor of the second station.

27. The method of claim 21, further comprising transmitting using the communication module the observations collected by the sensor to the third station.

28. The method of claim 21, wherein the third station is same as the second station.

29. The method of claim 21, wherein the first station comprises a database having location of the third station relative to the first station, the method further comprising:
modifying by the processor at least one constraint based on, at least in part, the location of the third station.

30. The method of claim 21, wherein:
the first station comprises a first unmanned aerial vehicle (UAV) and the third station comprises a second UAV different from the first UAV;
the data comprises location data; and
the method further comprises: (i) computing by the processor a location of the third station relative to the first station, and (ii) modify by the processor at least one constraint based on, at least in part, the location of the third station.

31. The method of claim 21, wherein the data comprises computation data generated by the processor.

32. The method of claim 21, wherein:
collecting observation by the sensor comprises using a dual-use waveform; and
via the communication module, at least one of: (i) receiving the observations and (ii) exchanging the data, using the dual-use waveform.

33. The method of claim 32, wherein the dual-use waveform is selected from the group consisting of: a biphase coded waveform, a biphase coded waveform comprising a pseudorandom sequence of phase shifts, and a Costas waveform.

34. The method of claim 21, wherein solving the optimization task comprises determining at least one of a path of the object and an attribute of the object.

\* \* \* \* \*